US012579751B2

(12) United States Patent
Gautron et al.

(10) Patent No.: US 12,579,751 B2
(45) Date of Patent: Mar. 17, 2026

(54) TECHNIQUES FOR PARALLEL EDGE DECIMATION OF A MESH

(71) Applicant: NVIDIA CORPORATION, Santa Clara, CA (US)

(72) Inventors: Pascal Gautron, Speracedes (FR); Christoph Kubisch, Aachen (DE)

(73) Assignee: NVIDIA CORPORATION, Santa Clara, CA (US)

( * ) Notice: Subject to any disclaimer, the term of this patent is extended or adjusted under 35 U.S.C. 154(b) by 229 days.

(21) Appl. No.: 18/468,218

(22) Filed: Sep. 15, 2023

(65) Prior Publication Data

US 2024/0104847 A1 Mar. 28, 2024

Related U.S. Application Data

(60) Provisional application No. 63/410,589, filed on Sep. 27, 2022.

(51) Int. Cl.
*G06T 17/20* (2006.01)
*G06T 17/10* (2006.01)

(52) U.S. Cl.
CPC ............ *G06T 17/205* (2013.01); *G06T 17/10* (2013.01); *G06T 2215/06* (2013.01)

(58) Field of Classification Search
None
See application file for complete search history.

(56) References Cited

U.S. PATENT DOCUMENTS

2017/0169608 A1* 6/2017 Starhill .................. G06T 15/04

OTHER PUBLICATIONS

Garland et al., "Surface Simplification using Quadric Error Metrics", cs.cmu.edu/~./garland/Papers/quadrics.pdf, retrieved Sep. 15, 2023, 8 pages.
Decoro et al., "Real-time Mesh Simplification Using the GPU", gfx.cs.princeton.edu/gfx/pubs/DeCoro_2007_RMS/real_time_simplification.pdf, retrieved Sep. 15, 2023, 6 pages.

* cited by examiner

*Primary Examiner* — Nurun Flora
(74) *Attorney, Agent, or Firm* — Squire Patton Boggs LLP; Sarah Mirza

(57) ABSTRACT

Various embodiments include techniques for performing parallel edge decimation on a high resolution mesh by collapsing multiple edges in parallel by blocking only the neighbor edges of the edges selected as collapse candidates. Effectively, the disclosed techniques dynamically partition the mesh into small partitions around the collapse candidates. In this manner, the techniques identify all the edges that may be independently collapsed in a single, now parallel, iteration. Edge decimation may be performed so that certain computational geometry techniques can be efficiently applied to a simpler mesh. In so doing, the disclosed techniques preserve the history of how the edge decimation process displaces the vertices of the original mesh to generate the simplified mesh. As a result, the results of the computational geometry techniques as applied to the simplified mesh can be propagated back to the original mesh.

23 Claims, 19 Drawing Sheets

700(3)

710(3)

720(3)

730(3)

734(3)

718(3)

732(3)

700(4)

710(4)

720(4)

736(4)

718(4)

734(4)

732(4)

| Level | Vertices | Pattern |
|---|---|---|
| 1 | 6 | |
| 2 | 15 | |
| 3 | 45 | |
| 4 | 153 | |
| 5 | 561 | |

800(1)

| Level | Vertices | Pattern |
|---|---|---|
| 1 | 6 | |
| 2 | 15 | |
| 3 | 45 | |
| 4 | 153 | |
| 5 | 561 | |

| Level | Vertices | Pattern |
|---|---|---|
| 1 | 6 | |
| 2 | 15 | |
| 3 | 45 | |
| 4 | 153 | |
| 5 | 561 | |

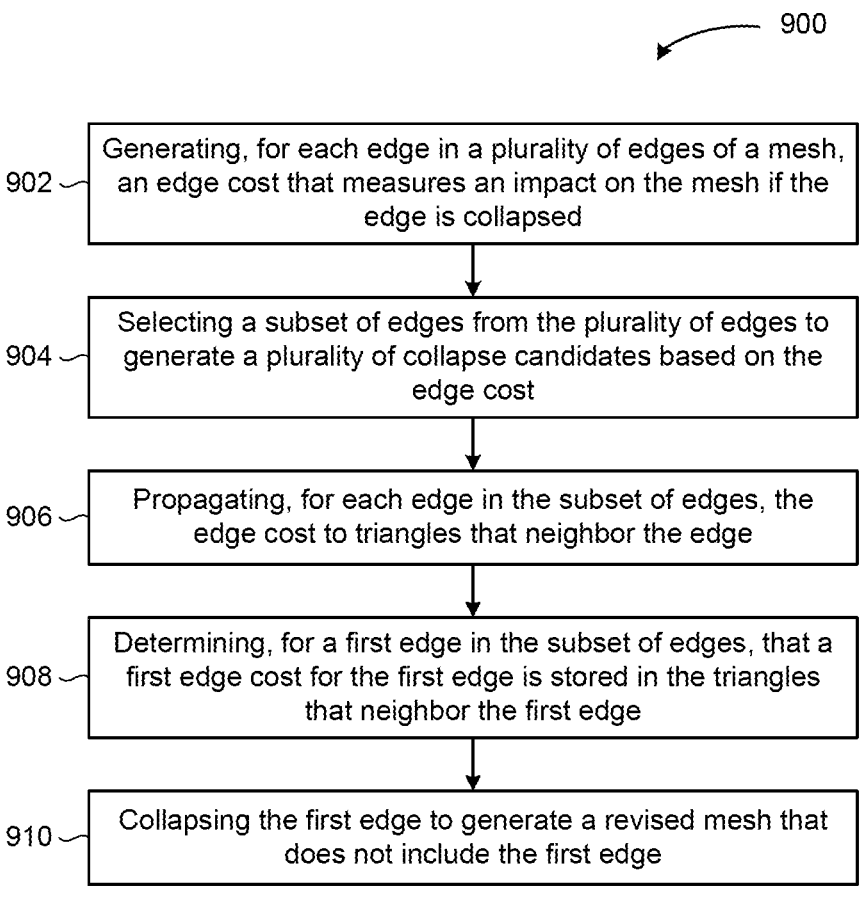

900

902 — Generating, for each edge in a plurality of edges of a mesh, an edge cost that measures an impact on the mesh if the edge is collapsed 904 — Selecting a subset of edges from the plurality of edges to generate a plurality of collapse candidates based on the edge cost 906 — Propagating, for each edge in the subset of edges, the edge cost to triangles that neighbor the edge 908 — Determining, for a first edge in the subset of edges, that a first edge cost for the first edge is stored in the triangles that neighbor the first edge 910 — Collapsing the first edge to generate a revised mesh that does not include the first edge

FIGURE 9

TECHNIQUES FOR PARALLEL EDGE DECIMATION OF A MESH

CROSS-REFERENCE TO RELATED APPLICATIONS

This application claims benefit of the United States Provisional Patent Application titled, "PARALLEL EDGE DECIMATION," filed on Sep. 27, 2022, and having Ser. No. 63/410,589. The subject matter of this related application is hereby incorporated herein by reference.

BACKGROUND

Field of the Various Embodiments

Various embodiments relate generally to graphics computing system architectures and, more specifically, techniques for parallel edge decimation of a mesh.

Description of the Related Art

A computing system generally includes, among other things, one or more processing units, such as central processing units (CPUs) and/or graphics processing units (GPUs), network adapters, and one or more memory systems. In computer graphics, object modeling software executed by CPUs and/or by GPUs is used to build object models to be rendered as part of a scene in a still image or an animation. These object models may be expressed as meshes of connected geometric primitives, such as triangles, quadrilaterals, and/or the like. The meshes are often not organized in a manner that facilitates further mesh processing operations. Accordingly, a topology generator application processes geometric primitives included in the mesh to generate a mesh topology. The resulting mesh topology may be more efficiently accessed by mesh processing operations that further process the mesh.

In some mesh processing operations, a large mesh with fine resolution is reduced to a simpler mesh for certain applications. A high-resolution mesh may be used when the animated character is near to the player's point of view. However, this high-resolution mesh is not necessary when the animated character is at a medium range or far away from the viewer. In such cases, the mesh may be simplified to a lower resolution. For example, without limitation, a high-resolution mesh containing 35 million triangles may be used when an animated character is near, and a low-resolution mesh containing 30,000 triangles may be used when an animated character is far away.

One technique for simplifying meshes is mesh decimation by edge collapse or, more simply, edge decimation. In some embodiments, edge decimation is an iterative process, in which a list of collapse candidates is first generated, then sorted according to a cost value that represents the mesh degradation incurred by collapsing each candidate edge. The edge with the lowest cost is collapsed, and the mesh topology as well as the candidate list are updated, so the next edge with the lowest cost may be collapsed. This iterative process of updating mesh topology, identifying a candidate edge, and collapsing the candidate edge is repeated until the desired mesh resolution is reached.

A conventional technique to increase the performance of this iterative process is to partition the mesh into independent parts that may be processed in parallel. This process is referred to herein as voxelization, and the partitions are referred to as voxels. With each iteration, one candidate edge is collapsed per partition. However, the performance and quality of these techniques is highly dependent on the chosen partition size. Further, this technique tends to result in problems at the interface of the partitions with one another.

As the foregoing illustrates, what is needed in the art are more effective techniques for performing edge decimation on graphics topologies in a graphics computing system.

SUMMARY

Various embodiments of the present disclosure set forth a computer-implemented method for performing edge decimation on a mesh in a computing system. The method includes generating, for each edge in a plurality of edges of a mesh, a corresponding edge cost representative of an amount of change on the mesh if the edge is collapsed. The method further includes selecting, based on at least one edge cost corresponding to a given edge in the plurality of edges, a plurality of collapse candidates from the plurality of edges. The method further includes propagating, for each edge in the subset of edges, the edge cost to triangles that neighbor the edge. The method further includes determining, for a first edge in the subset of edges, that a first edge cost for the first edge is stored in an edge buffer associated with the triangles that neighbor the first edge. The method further includes collapsing the first edge to generate a modified mesh that does not include the first edge.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, upon selecting an edge for collapse, the techniques restrict only a small set of additional edges in the neighborhood of the selected edge as being ineligible to collapse in the same iteration. Further, multiple edges may be selected for collapse in the same iteration, so long as no two edges being collapsed in a given iteration have intersecting neighborhoods. In this manner, the techniques may maximize the number of collapse operations per iteration and do not have the limitations of prior partitioning techniques. These advantages represent one or more technological improvements over prior art approaches.

BRIEF DESCRIPTION OF THE DRAWINGS

So that the manner in which the herein recited features of the various embodiments may be understood in detail, a more particular description of the inventive concepts, briefly summarized herein, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 9 is a flow diagram of method steps for performing parallel edge decimation by the computing system of FIG. 1, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
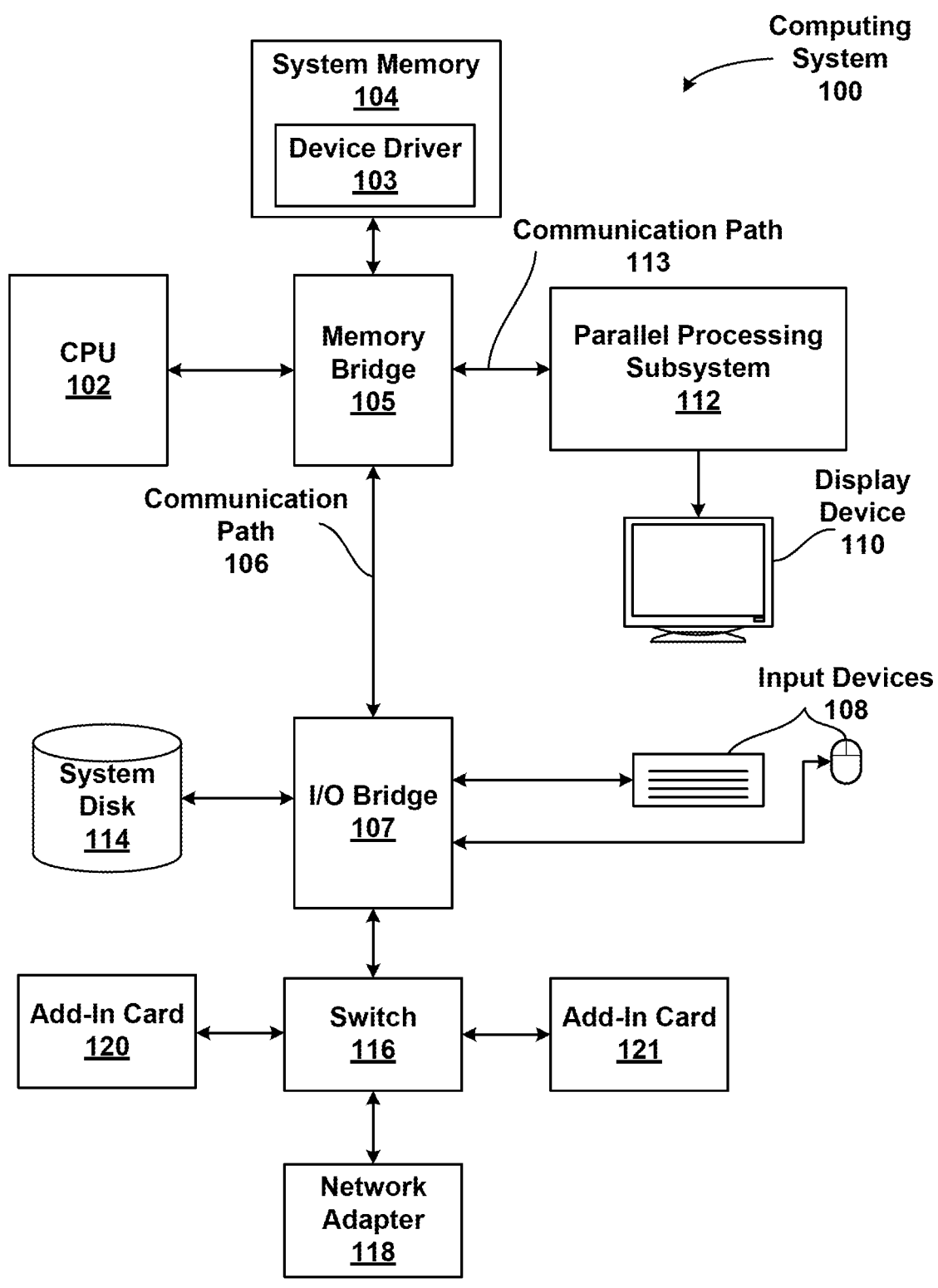
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some non-limiting examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some non-limiting examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and/or the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, without limitation, video output circuitry. As described in greater detail herein in FIG. 2, such circuitry may be incorporated across one or more parallel processors included within parallel processing subsystem 112. A parallel processor includes any one or more processing units that may execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, parallel processing subsystem 112 includes two processors, referred to herein as a primary processor (normally a CPU) and a secondary processor. In some embodiments, the primary processor is a CPU and the secondary processor is a GPU. Additionally or alternatively, each of the primary processor and/or the secondary processor may be any one or more of the types of parallel processors disclosed herein, in any technically feasible combination. The secondary processor receives secure commands from the primary processor via a communication path that is not secured. The secondary processor accesses a memory and/or other storage system, such as system memory 104, Compute eXpress Link (CXL) memory expanders, memory managed disk storage, on-chip memory, and/or the like. The secondary processor accesses this memory and/or other storage system across an insecure connection. The primary processor and/or the secondary processor may communicate with one another via a GPU-to-GPU communications channel, such as Nvidia Link (NV-Link). Further, the primary processor and/or the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the parallel processing subsystem 112 incorporates circuitry optimized for general purpose and/or compute processing. Again, such circuitry may be incorporated across one or more parallel processors included within parallel processing subsystem 112 that are configured to perform such general purpose and/or compute operations. In yet other embodiments, the one or more parallel processors included within parallel processing subsystem 112 may be configured to perform graphics processing, general purpose processing, and compute processing operations. System memory 104 includes at least one device driver 103 configured to manage the processing operations of the one or more parallel processors within parallel processing subsystem 112.

In various embodiments, parallel processing subsystem 112 may be integrated with one or more other the other elements of FIG. 1 to form a single system. For example, without limitation, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and/or the number of parallel processing subsystems 112, may be modified as desired. For example, without limitation, system memory 104 may be connected to CPU 102 directly rather than through memory bridge 105, and other devices may communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, without limitation, switch 116 may be eliminated, and network adapter 118 and add-in cards 120, 121 may connect directly to I/O bridge 107.

Figure 2:
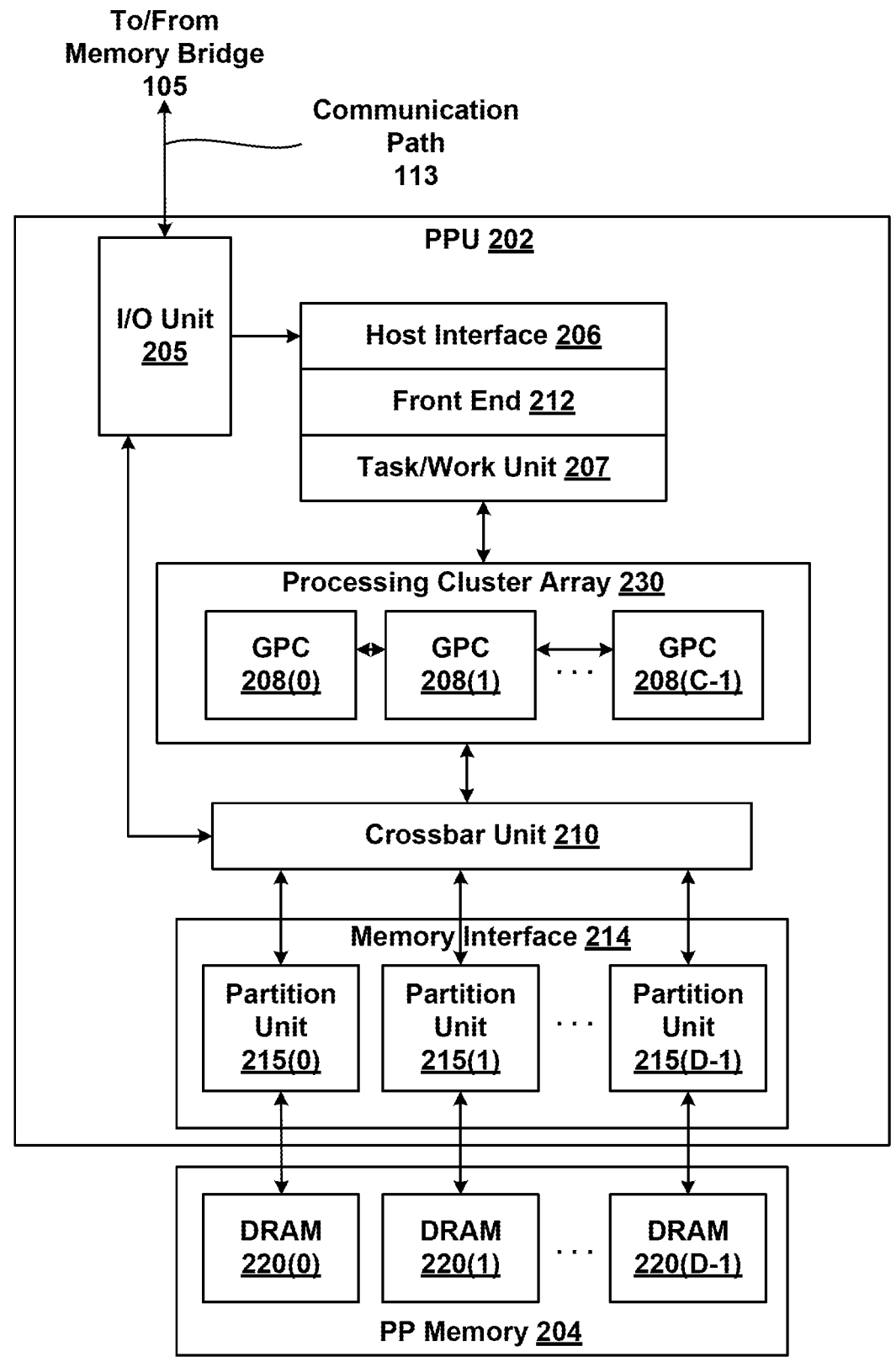
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated herein, parallel processing subsystem 112 may include any number of PPUs 202. Further, the PPU 202 of FIG. 2 is one non-limiting example of a parallel processor included in parallel processing subsystem 112 of FIG. 1. Alternative parallel processors include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of parallel processor(s) included within parallel processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 may be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or parallel processors other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, without limitation, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned herein in conjunction with FIG. 1, the connection of PPU 202 to the rest of computing system 100 may be varied. In some embodiments, parallel processing subsystem 112, which includes at least one PPU 202, is implemented as an add-in card that may be inserted into an expansion slot of computing system 100. In other embodiments, PPU 202 may be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, without limitation, the state parameters and commands may define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 may be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computing system 100.

As noted herein, any number of PPUs 202 may be included in a parallel processing subsystem 112. For example, without limitation, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, without limitation, different PPUs 202 might have different numbers of processing cores and/or different amounts of PP memory 204. In implementations where multiple PPUs 202 are present, those PPUs may be operated in parallel to process data at a higher throughput than is possible with a single PPU 202.

Systems incorporating one or more PPUs 202 may be implemented in a variety of configurations and form factors, including, without limitation, desktops, laptops, handheld personal computers or other handheld devices, servers, workstations, game consoles, embedded systems, and/or the like.

Figure 3:
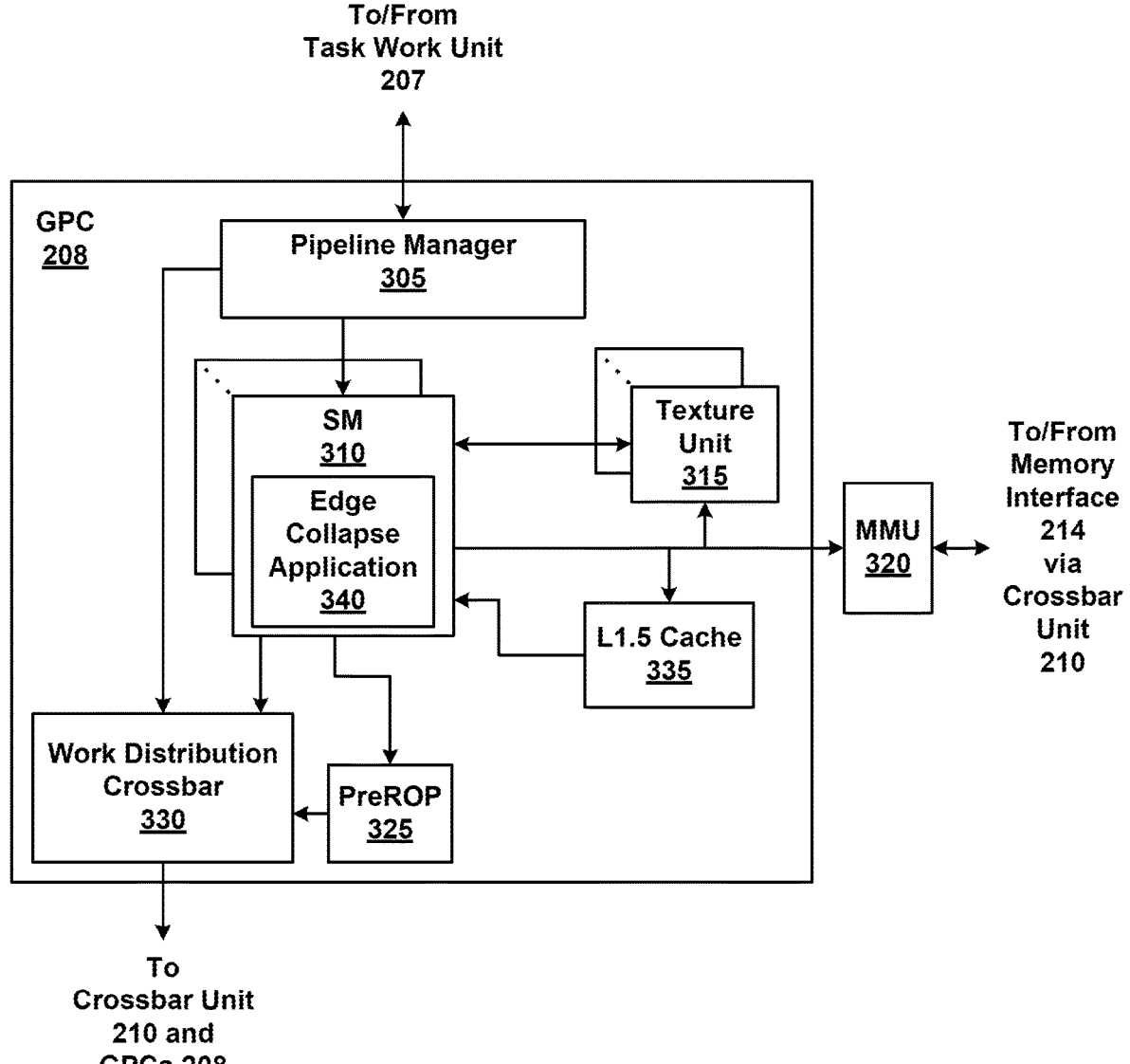
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit may be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 may support up to G thread groups concurrently, it follows that up to G*M thread groups may be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the herein-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

In addition, SM 310 includes an edge collapse application 340 stored in a memory of SM 310. Edge collapse application 340, when executed by SM 310, performs one or more operations associated with the techniques further described herein. When performing the operations associated with the disclosed techniques, edge collapse application 340 stores data in and retrieves data from memory, such as a local memory shared by one or more SMs 310, a cache memory, parallel processing memory 204, system memory 104, and/or the like.

In operation, edge collapse application 340 employs various data structures stored in memory when performing the operations described herein. These data structures store input data received by edge collapse application 340, output data generated by edge collapse application 340, store temporary data accessed by edge collapse application 340 during execution, and/or the like. In some embodiments, the layout of data included in the data structures, the lifetime of the data structures, and/or the like may vary within the scope of the present disclosure.

Edge collapse application 340 invention receives various data that describes an input mesh. The input mesh may be a two-dimensional (2D) mesh, a three-dimensional (3D) mesh, and/or the like. The input mesh includes Nv input vertices and Np geometric primitives. The vertices of the mesh are represented by a vertex buffer Pin that includes the vertex positions vp. The geometric primitives of the mesh are described by an index buffer Iin that includes a set of unsigned integer values (e.g., 32-bit unsigned integers) per geometric primitive, where each index corresponds to the vertex at the corresponding index in the vertex buffer Pin.

In various embodiments, the geometric primitives are triangles and, therefore, each triangle is represented by three indices. For ease of discussion, the present disclosure describes techniques related to meshes composed of triangles. However, the disclosed techniques may be applied to meshes composed of any one or more types of geometric primitives, such as triangles, quadrilaterals, and/or the like. For example, without limitation, the disclosed techniques may be applied to a mesh composed of quadrilaterals where each quadrilateral is represented by four indices. More generally, the disclosed techniques may be applied to meshes composed of any types of polygonal geometric primitives, in any combination, and may also encompass control grids of subdivision surfaces.

In some examples, without limitation, a mesh may include multiple vertices located at the same position in space, either due to complete duplication or by the presence of discontinuities in other vertex attributes. In the case of complete duplication, multiple vertices existing at the same position may be part of different geometric primitives that share vertex attributes at the position. One non-limiting example is a set of vertices that meet at the same position within the interior of a face of a cube, where the vertices have the same color, the same normal vector, the same texture coordinates, etc. as one another. In the case of discontinuities, multiple vertices existing at the same position may nevertheless have different vertex attributes from one another. One non-limiting example is a set of vertices that meet at the same position at the corner of a cube where three faces of the cube meet at the corner. In this non-limiting example, the vertices have the same position but may have different normal vectors. Further, other vertex attributes, such as color values and texture coordinates, may be the same for the multiple vertices or may be different for the multiple vertices.

In order to facilitate various computational geometry techniques, the input data further includes topological data, such as connectivity of the input vertices, for a mesh whether the mesh includes multiple vertices located at the same position due to complete duplication and/or multiple vertices located at the same position with discontinuities in other vertex attributes. In one or more embodiments, the input data includes a secondary index buffer $I_{out}$, that represents the geometric primitives, where each distinct (32-bit unsigned integer) index included in the secondary index buffer $I_{out}$ corresponds to a unique position in space.

Each vertex v of the mesh the topological data includes: (1) a flag $v_f$ representing the status of the vertex v; and (2) an index $v_i$ representing a triangle t included in secondary index buffer $I_{out}$ that references the vertex v. This additional per-vertex data is stored in a vertex buffer named $V_{out}$. The vertex buffer $V_{out}$ includes $N_v$ elements, which is the number of input vertices of the mesh.

The status flag $v_f$ representing the status of the vertex v combines one or more individual status conditions of the vertex v. In one or more embodiments, one status condition of the vertex v may be "unknown," indicating that the status of the vertex v is not determined. Another status condition of the vertex v may be "used," indicating that at least one triangle t references the vertex v. Yet another status condition of the vertex v may be "orphan," indicating that that no triangle t references the vertex v. Still another status condition of the vertex v may indicate that the vertex v is along a discontinuity. Yet another status condition of the vertex v may indicate that the vertex v is at the crossing of multiple discontinuities. Yet another status condition of the vertex v may indicate that the vertex v is adjacent to more than one discontinuity. A given vertex v may have any one or more of these status conditions in any combination. In some embodiments, the flag of is represented using a bit field, such as an 8-bit unsigned integer.

The topological data further includes primitive edges e for the geometric primitives included in the mesh. A primitive edge e is represented by two integer indices e1 and e2 referencing two vertices. The primitive edges e are stored in an edge buffer named $E_{out}$. The edge buffer $E_{out}$ is sized to include the largest number of possible edges in a worst-case scenario where all geometric primitives are disjoint and, therefore, all primitive edges e are likewise disjoint. Therefore, an edge buffer $E_{out}$ for a mesh that includes triangles is sized to store three edges per triangle, for a total of $3N_p$ elements. Similarly, an edge buffer $E_{out}$ for a mesh that includes quadrilaterals may be sized to store four edges per quadrilateral, for a total of $4N_p$ elements. The topological data further includes an integer value $N_e$ representing the number of unique primitive edges included in the mesh.

In addition, for each triangle t of the mesh the topological data includes: (1) a vector $t_t$ of three integer values referencing another triangle adjacent to each vertex v of the triangle t, respectively; (2) a vector $t_e$ of three integer values referencing the edges e of the triangle t stored in the edge buffer $E_{out}$; and (3) a binary flag $t_f$ indicating whether the triangle t is degenerate or not. A triangle t is degenerate if the triangle t has a surface area of zero. This per-triangle data is stored in a triangle buffer $T_{out}$. The triangle buffer $T_{out}$ includes $N_p$ elements, one element for each geometric primitive included in the mesh.

To perform edge decimation on a mesh, edge collapse application 340 generates certain temporary data structures. Edge collapse application 340 stores data in and retrieves data from these temporary data structures. In one or more embodiments, for each edge e in the edge buffer $E_{out}$, edge collapse application 340 generates an edge cost $e_c$ that represents the error incurred by collapsing that edge e. In some embodiments, the edge cost $e_c$ is represented by a single floating-point value per edge e.

Edge collapse application 340 further generates a selected edge buffer $S_{out}$ that includes the edges selected for collapse. Edge collapse application 340 generates a select count Ns, which is an unsigned integer that includes a count of the current number of edges in the selected edge buffer $S_{out}$.

For each edge e in the edge buffer $E_{out}$, edge collapse application 340 generates an edge cost descriptor d which represents the edge index $i_e$ of an edge e and the associated edge cost $e_c$ of the edge e. In some embodiments, without limitation, the edge cost descriptor d descriptor is a 64-bit unsigned integer, where the 32 most significant bits (MSBs) are the binary representation of the edge cost $e_c$ and the 32 least significant bits (LSBs) are the binary representation of the edge index $i_e$. Edge collapse application 340 generates an edge cost descriptor $t_d$ for each triangle t in the mesh.

For each vertex v of the mesh, edge collapse application 340 generates a first collapse target index $v_{dc}$, which is an unsigned integer that represents the index of the deduplicated vertex with which the vertex v is to be merged. Edge collapse application 340 further generates a second collapse target index $v_c$, which is an unsigned integer that represents the index of the original vertex with which the vertex v is to be merged.

Before performing the disclosed techniques, edge collapse application 340 initializes the described data structures to prepare those data structures for performing edge decimation for the mesh. For each triangle in the mesh, edge collapse application 340 initializes the edge cost descriptor $t_d$ for each triangle t to a predetermined value such as by setting all 64 bits of the edge cost descriptor $t_d$ to 1, representing the largest representable value. Edge collapse application 340 leaves the edge cost $e_c$ stored in the edge buffer $E_{out}$, in an uninitialized state. Edge collapse application 340 initializes the select count Ns to 0. For each vertex v of the mesh, edge collapse application 340 initializes the first collapse target index $v_{dc}$ and the second collapse target index $v_c$, to a NOT_FOUND, state. In some non-limiting examples, the vertex index $v_i$ is a 32-bit unsigned integer, and the value representing a "NOT_FOUND" status is where all 32 bits are set to 1, such that NOT_FOUND=4, 294,967,295.

Edge collapse application 340 generates edge costs $e_c$, which is the error incurred by collapsing an edge e, using one or more techniques. For example, without limitation, edge collapse application 340 generates edge cost $e_c$ by a method that uses an error metric based on quadrics representing the local curvature of the mesh at each vertex v. In some embodiments, a higher local curvature indicates areas of finer detail in the mesh, sharper surfaces, and/or the like, where simplifying the mesh in the area of such a curvature could remove this detail, thereby resulting in undesirable artifacts in the simplified mesh. On the other hand, a lower local curvature indicates areas of lower detail in the mesh, flatter surfaces, and/or the like, where simplifying the mesh in the area of such a curvature is less likely to result in undesirable artifacts in the simplified mesh.

Further, in some embodiments, the edge costs $e_c$ may be function, at least in part, of a user defined importance map that identifies a relative importance of different areas of the mesh. For example, without limitation, areas of an object that articulate, such as elbow joints, knee joints, wrists, and/or the like, may have a higher importance than areas of the object that do not articulate, such as the forearm, shin, palm, and/or the like. Areas of an object that are exposed, such as the hands, face, and/or the like, may have a higher importance than areas of the object that are covered by clothing, such as the torso, upper legs, and/or the like.

In some non-limiting examples, the importance map is a texture map that coincides with the surface of the mesh. The texture map includes values that correspond to the vertices of the mesh, where those values vary from a first value to a second value. Areas of the importance map that include values nearer to the first value indicate areas of that mesh that are low in importance. These areas of low importance correspondingly have a lower edge cost $e_c$ where simplifying the mesh in the areas of low importance is less likely to result in undesirable artifacts in the simplified mesh. Areas of the importance map that include values nearer to the second value indicate areas of that mesh that are high in importance. These areas of high importance correspondingly have a higher edge cost $e_c$ where simplifying the mesh in the areas of high importance is more likely to result in undesirable artifacts in the simplified mesh.

The edge cost $e_c$ may further be based on one or more other factors. For example, without limitation, the edge cost $e_c$ may be based on the length of an edge, the valence of the vertices of the edge, and/or the like. With regard to the length of the edge, collapsing shorter edges may result in fewer artifacts, and is therefore preferable, than collapsing longer edges. Therefore, shorter edges may have a lower edge cost $e_c$ while longer edges may have a higher edge cost $e_c$. With regard to the valence of the vertices of the edge, the valence of a vertex indicates the number of triangles that are adjacent to the vertex. Collapsing an edge with two vertices that have a low valence may result in fewer artifacts, and is therefore preferable, than collapsing an edge where at least one of two vertices has a high valence. Therefore, edges whose vertices have low valence may have a lower edge cost $e_c$ while edges that have one or both vertices with a high valence may have a higher edge cost $e_c$. Additionally or alternatively, other techniques for determining edge cost $e_c$ may be used within the scope of the present disclosure.

For example, without limitation, edge collapse application 340 generates the edge cost $e_c$ according to an edge cost function for an edge e comprising vertices v0 and v1 located at positions p0 and p1, respectively. This exemplary edge cost function is shown in Equation 1 below:

$$C(e)=|p0-p1|*(1+\max(c0,c1)\alpha)*\max(1,\beta((V(v0)+V(v1)-2)-6)) \tag{1}$$

where $|p0-p1|$ represents the length of the edge, $(c0, c1)\in[0, 1]^2$ represents a local curvature at v0 and v1, respectively, $V(v0)$ and $V(v1)$ are the valences of the vertices v0 and v1, respectively, $\alpha$ is a user-defined floating-point coefficient determining the importance of the local curvature, and $\beta$ is a user-defined floating-point coefficient determining the importance of the final vertex valence.

In some non-limiting examples, edge collapse application 340 generates the curvature values c0, c1 using ray tracing. With this technique, for a vertex v with position p and normal n, edge collapse application 340 traces a number of rays originating at p and in pseudorandom directions while sampling the hemisphere above p and the hemisphere below p. For explanatory purposes, the hemisphere above p and the hemisphere below p are referred to herein as the north hemisphere and the south hemisphere, respectively. Accordingly, the number of traced rays in the north hemisphere and the south hemisphere are identified as $n_n$ and $n_s$, respectively. For both the north hemisphere and the south hemisphere, edge collapse application 340 counts the number of rays hn, hs that intersect, or hit, a surface within a sphere that has a user-defined radius r around p in the north hemisphere and the south hemisphere, respectively. Edge collapse application 340 determines the curvature c by the ratios of hits hn, hs to the total number of rays $n_n$, $n_s$ traced in the north hemisphere and the south hemisphere, respectively. The curvature is shown in Equation 1 below:

$$c=\max(h_n/n_n,h_s/n_s) \tag{2}$$

Based on the edge costs ec, edge collapse application 340 selects candidate edges for extraction, also referred to herein as collapse. In some embodiments, edge collapse application 340 performs edge decimation by reducing the number of geometric primitives in the mesh while avoiding damage to the mesh topology. In particular, edge collapse application 340 avoids damage to the mesh topology by preserving the attribute discontinuities and geometric edges present in the original mesh as much as feasible. To this end, edge collapse application 340 identifies the unique edges of the mesh and eliminates the edges whose collapse would not result in visible artifacts.

For example, without limitation, an edge e linked to vertices v0 and v1 is considered a collapse candidate if: (1) the edge e is linked to at most two triangles; (2) the edge cost $C(e)<C_{max}$, where $C_{max}$ is a user-defined cost threshold; and (3) one of three criteria is satisfied. These three criteria are: (1) both vertex v0 and vertex v1 are along a discontinuity; (2) neither vertex v0 nor vertex v1 is along a discontinuity; or (3) one of vertex v0 and vertex v1 is along a discontinuity and the other of vertex v0 and vertex v1 is adjacent to more than one discontinuity. In some non-limiting examples, this list of criteria is not exhaustive, and edge collapse application 340 may additionally and/or alternatively employ other criteria. Edge collapse application 340 adds the collapse candidates to the selected edge buffer Sout and atomically increments the select count Ns accordingly upon each addition to the selected edge buffer Sout.

After selecting candidate edges for collapse, edge collapse application 340 propagates the cost descriptors for the collapse candidates in the selected edge buffer Sout. Collapsing an edge may change or alter the geometric primitives that are neighbors of the collapsed edge. Therefore, in some non-limiting embodiments, edge collapse application 340 limits a given neighborhood of edges to one edge collapse operation. In some conventional techniques, this restriction leads to allowing only one edge collapse operation in the mesh during a given iteration of edge decimation. Such an iterative approach results in considering only one edge at a time, starting from the lowest cost, and updating the collapse candidates list after each collapse operation. Such techniques may have low performance, particularly for a large mesh. By contrast, with the disclosed techniques, edge collapse application 340 identifies all potential edges that may be independently collapsed in a single, parallel iteration.

In one or more embodiments, edge collapse application 340 considers each edge e in the selected edge buffer Sout in a given iteration, where each edge e is linked to respective vertices v0 and v1. In so doing, edge collapse application 340 generates an edge cost descriptor $e_d$ for each edge e as described herein. Edge collapse application 340 iterates over each triangle t adjacent to either v0 or v1 of an edge e. Edge collapse application 340 replaces the edge cost descriptor $t_d$ for a triangle t by the generated edge cost descriptor $e_d$ if $e_d<t_d$. In some embodiments, if the edge cost descriptor is a 64-bit descriptor, then edge collapse application 340 performs this edge cost descriptor replacement operation in a single atomic step using an atomic minimum operation. Because the values of the edge cost descriptors $t_d$ are initialized to the largest representable value, as described herein, the first invocation of the atomic minimum operation succeeds. Subsequent invocations of the atomic minimum operation succeed if the newly generated edge cost descriptor $e_d$ has a lower cost than the stored edge cost descriptor $t_d$.

In some non-limiting examples, the propagation breadth of the edge cost descriptor propagation operation is dependent on the edge cost function. The edge cost function described herein depends on local information such as the vertex position. Therefore, propagation of edge cost descriptors using this edge cost function is limited to within the immediate neighborhood of triangles, referred to herein as the 1-ring of triangles, adjacent to the considered vertices. Alternative edge cost functions may result in propagation of edge cost descriptors to wider areas. In some non-limiting examples, propagation of edge cost descriptors to wider areas may be performed over multiple passes, where each triangle t iterates over direct neighbors of the triangle t and propagates the edge cost descriptor $t_d$ of the triangle t using atomic minimum operations.

Based on the propagation of the cost descriptors for the collapse candidates in the selected edge buffer $S_{out}$, edge collapse application 340 identifies collapsed vertices. For each edge e in the selected edge buffer Sout, edge collapse application 340 iterates over the triangles adjacent to the vertices v0 and v1 of the edge e. If an adjacent triangle t includes edge e, then edge collapse application 340 retrieves the edge cost descriptors $t_d$ and $e_d$, respectively. If $t_d=e_d$ for all adjacent triangles, then edge collapse application 340 determines that the edge e is the edge with the minimal cost within the area of influence of a collapse operation. In such cases, edge collapse application 340 may collapse the edge e without affecting other collapse operations. This edge e references vertices v0 and v1, located at deduplicated indices d0 and d1, respectively, in the vertex buffer Pin. If d0<d1, then edge collapse application 340 sets $v0_{dc}=d1$ and sets $v1_{dc}=$NOT_FOUND. Otherwise, edge collapse application 340 sets $v1_{dc}=d0$ and $v0_{dc}=$NOT_FOUND.

Because the edges are defined using the deduplicated indices stored in the secondary index buffer Iout, edge collapse application 340 translates the collapse operation in terms of the original indices stored in the original index buffer Iin of the mesh. For each triangle t of the mesh, edge collapse application 340 retrieves the original indices i0, i1, i2 of the triangle t in the index buffer Iin, and retrieves the corresponding deduplicated indices d0, d1, d2 of the triangle t in the secondary index buffer Iout. For example, without limitation, when processing a first vertex v0 of a triangle t, if $v0_c=d1$, then edge collapse application 340 determines that the edge e between the vertices v0 and v1 is to be collapsed. If i0<i1, then edge collapse application 340 sets $v0_c=i1$ and sets $v1_c=$NOT_FOUND. Otherwise, edge collapse application 340 sets $v1_c=i0$ and sets $v0_c=$NOT_FOUND.

Based on the identified collapsed vertices, edge collapse application 340 performs the edge collapse operation. At this point, the value $v_c$ of each vertex v either stores the index of another vertex involved in the collapse operation, or stores the value NOT_FOUND. Edge collapse application 340 performs an edge collapse operation using one or more techniques. In some non-limiting examples, edge collapse application 340 merges the vertices located at positions p0 and p1 of the collapsed edge, resulting in a new vertex at a merged position p at the midpoint between the original vertices of the collapsed edge according to the formula: $p=(p0+p1)/2$. Additionally or alternatively, edge collapse application 340 merges the vertices located at positions p0 and p1 of the collapsed edge, resulting in a merged vertex at position p0, a merged vertex at position p1, a merged vertex at any suitable position between positions p0 and p1, and/or the like.

Edge collapse application 340 interpolates the vertex attributes of vertices at positions p0 and p1 of the collapsed edge to generate the attributes of this merged vertex at position p. Edge collapse application 340 updates the mesh by propagating the removal of the vertices located at positions p0 and p1 and the addition of merged vertex at position p to the index buffer Iin and the secondary index buffer Iout. Further, edge collapse application 340 updates the topological data for the mesh accordingly.

In some non-limiting examples, edge collapse application 340 leverages the ability of a topology generator application to remove duplicate vertices. After the removal of the duplicate vertices by such a topology generator application, edge collapse application 340 overwrites the vertices v0 and v1 with the generated midpoint vertex. In such cases, as a result, the triangles containing a collapsed edge become degenerate, because such triangles have a surface area of zero. The topological data generator application subsequently eliminates such degenerate triangles, thereby reducing the final triangle count of the mesh.

After applying the operations described herein, and if one or more collapse operations were performed by these operations, then the resulting mesh includes fewer geometric primitives than the original mesh. Because a collapse operation for a given edge in a current iteration effectively blocks other collapse operations within the neighborhood of the collapsed edge, the resulting mesh may have additional edges with a sufficiently low edge cost such those edges are now candidates for collapse in a subsequent iteration. As a result, edge collapse application 340 may perform the described operations iteratively any number of times until a desired level of edge decimation is achieved. For example, edge collapse application 340 may perform the described operations on an original mesh to generate a first simplified mesh. Collapse application 340 may perform the described operations on the first simplified mesh to generate a second simplified mesh. The edge collapse application 340 may perform the described operations on the second simplified mesh to generate a third simplified mesh, and so on, until a threshold is reached with respect to the mesh, such as a number of iterations of the described operations, a mesh with no more than a maximum number of geometric primitives, a minimum percentage reduction in the number of geometric primitives included in the mesh, and/or the like.

In some examples, without limitation, edge collapse application 340 may employ the disclosed techniques for other per-edge geometric processes as well. For example, without limitation, certain computational geometry techniques may benefit from a mesh whose triangles have low anisotropy, i.e., a mesh that includes triangles that tend to be equilateral. Such a process of reducing average anisotropy of a mesh is referred to herein as a mesh relaxation. In such examples, edge collapse application 340 may employ a cost function of an edge e that estimates the anisotropy loss (or anisotropy gain) incurred on neighboring triangles if edge collapse application 340 slightly adjusts the length of that edge e, such as by shortening the edge e. For example, without limitation, edge collapse application 340 may determine the current anisotropy A of the triangles by summing the anisotropies of the triangles adjacent to either vertex of the edge e. Similarly, edge collapse application 340 determines the anisotropy As of the triangles after edge shortening. If the anisotropy values vary within the [0, 1] range, then edge collapse application 340 may use a cost function of the form shown in Equation 3 below:

$$C(e)=1+As(e)-A(e) \tag{3}$$

In some embodiments, the amount of edge shortening per iteration and the number of iterations may be chosen arbitrarily. In some non-limiting examples, edge collapse application 340 may shorten the edge length by 10% for the first iteration, shorten the edge length by 5% for the second iteration, and repeat the process with smaller percentage edge length adjustments for a total of 10 iterations.

In some examples, without limitation, the mesh decimation techniques described herein may be employed to generate a simplified mesh, where additional displacement data that includes the missing details relative to the original mesh may be applied at render time. This displacement data may be generated using raytracing, by tracing rays from the surface of the simplified mesh towards the surface of the original mesh. In one or more embodiments, the original mesh and the simplified mesh are considered to be independent sets of geometric primitives, for which the maximum ray tracing distance may be manually adjusted. The sampling density may be manually adjusted to match the frequency of the displacements from the original mesh to the simplified mesh. In order to track the displacement data, edge collapse application 340 maintains a relationship between the geometric primitives of the original mesh and the geometric primitives of the simplified mesh during the edge decimation process. Maintaining the relationship between the geometric primitives of the two meshes allows subsequent applications to identify the decimated triangle corresponding to a given original vertex. From the tracked displacement data, such subsequent applications may retrieve a list of the original vertices in the original mesh that are represented by any given simplified triangle in the simplified mesh. The subsequent applications may deduce the sampling density and ray tracing distance appropriate for the generation of the displacement data.

To generate this displacement data, edge collapse application 340 generates an additional temporary data structure called $V_{alias}$ that includes $N_v$ elements, where each of the $N_v$ elements is an unsigned integer index. Edge collapse application 340 initializes each element of $V_{alias}$ to the value NOT_FOUND. When edge collapse application 340 collapses an edge e edge collapse application 340 interpolates the vertices v0 and v1 of the edge e (such as to a midpoint between the vertices v0 and v1) so that the vertices v0 and v1 are identical. In a subsequent vertex deduplication pass, edge collapse application 340 selects one of these two identical vertices, and discards the other vertex. For example, without limitation, edge collapse application 340 may preserve the vertex v0 located at index e0 of a collapsed edge and discard the identical vertex v1 located at index e1 of the collapsed edge. In such cases, edge collapse application 340 sets the element $V_{alias}$ [e1]=e0 and leaves the element $V_{alias}$ [e1] unchanged. If, instead, edge collapse application 340 discards vertex v0, edge collapse application 340 sets $V_{alias}$ [e0]=e1 and leaves the element $V_{alias}$ [e0] unchanged. As a result, edge collapse application 340 generates a linked list representing the sequence of collapse operations, where edge collapse application 340 associates each original vertex in the original mesh to the corresponding representative vertex in the simplified mesh vertex.

Using the data from these linked lists, an application, such as edge collapse application 340 and/or a computational geometry application, may identify which simplified triangle in the simplified mesh that each original vertex in the original mesh maps to. For an original vertex v at index i, the application identifies the corresponding representative simplified vertex v' at index i'. The application retrieves the value a=$V_{alias}$ [i]. If a=NOT_FOUND, then the application determines that the vertex is still used in the simplified mesh (albeit potentially at another position). In such cases, the application sets v'=v and i'=i.

By construction, the original vertex v is located in a prismoid above (or below) one of the triangles adjacent to vertex v'. Edge collapse application 340 iterates over those triangles and determines the triangle t whose geometric surface is closest to the location of the original vertex v. The application determines the distance between t and v using one or more techniques.

For example, without limitation, the application may use the data from these linked lists to deduce an estimate of the original triangle density in the original mesh corresponding to each simplified triangle in the simplified mesh. The application may use this estimate of the original triangle density, in turn, to drive the sampling density of the displacement data. The data from these linked lists may also be used during the decimation process itself to generate simplified triangles that map roughly to a uniform number of original vertices. The data from these linked lists may also be used to block some collapse operations if the collapse operation results in an excessive original vertex count per simplified triangle.

Another use case for the data from these linked lists is the estimation of minimum and maximum displacement values. Because the application is able to compute the distance between each original vertex and the corresponding representative triangle, the application may determine the minimum and maximum distances and may store the minimum and maximum distances. The application may use the minimum and maximum distances in the raytracing process for generating displacement data.

It will be appreciated that the core architecture described herein is illustrative and that variations and modifications are possible. Among other things, any number of processing units, such as SMs 310, texture units 315, or preROP units 325, may be included within GPC 208. Further, as described herein in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, system memory 104, and/or the like. Please also note, as used herein, references to cache memory may include any one or more technically feasible memories, including, without limitation, an L1 cache, an L1.5 cache, and/or the L2 caches.

Parallel Edge Decimation

Various embodiments include techniques for performing parallel edge decimation on a high resolution mesh by collapsing multiple edges in parallel by blocking only the neighbor edges of the collapse candidates. Effectively, the disclosed techniques dynamically partition the mesh into small partitions around the collapse candidates. In this manner, the techniques identify all the edges that may be independently collapsed in a single, now parallel, iteration.

Further, some meshes have very high resolution and fine detail, such that applying computational geometry techniques directly to such a high resolution mesh can be computationally intensive, resulting in long latency. For example, without limitation, characters, scene objects, and sets in an animated feature film can have high resolution meshes in order to accurately present fine details on a large movie theater screen. In gaming applications, a high resolution mesh of an object may be appropriate with the object is near the user, whereas a simplified lower resolution mesh may be appropriate when the object is far away from the user. Therefore, edge decimation may be performed so that certain computational geometry techniques can be efficiently applied to a simpler mesh. In so doing, the disclosed techniques preserve the history of how the edge decimation process displaces the vertices of the original mesh to generate the simplified mesh. As a result, the results of the computational geometry techniques as applied to the simplified mesh can be propagated back to the original mesh.

Figure 4A:
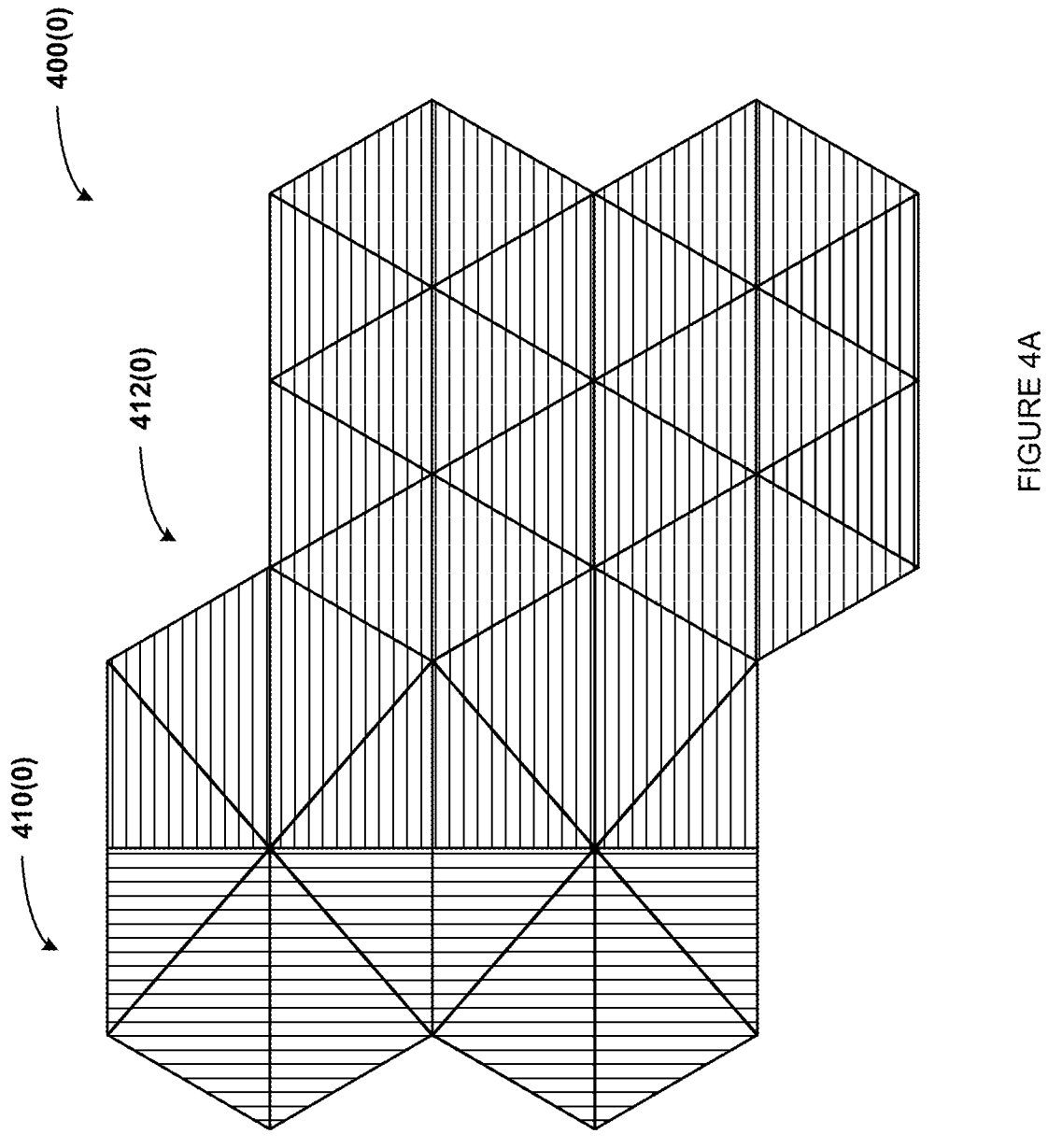
FIGS. 4A-4B illustrate selecting edges as collapse candidates, according to various embodiments.
Figure 4B:
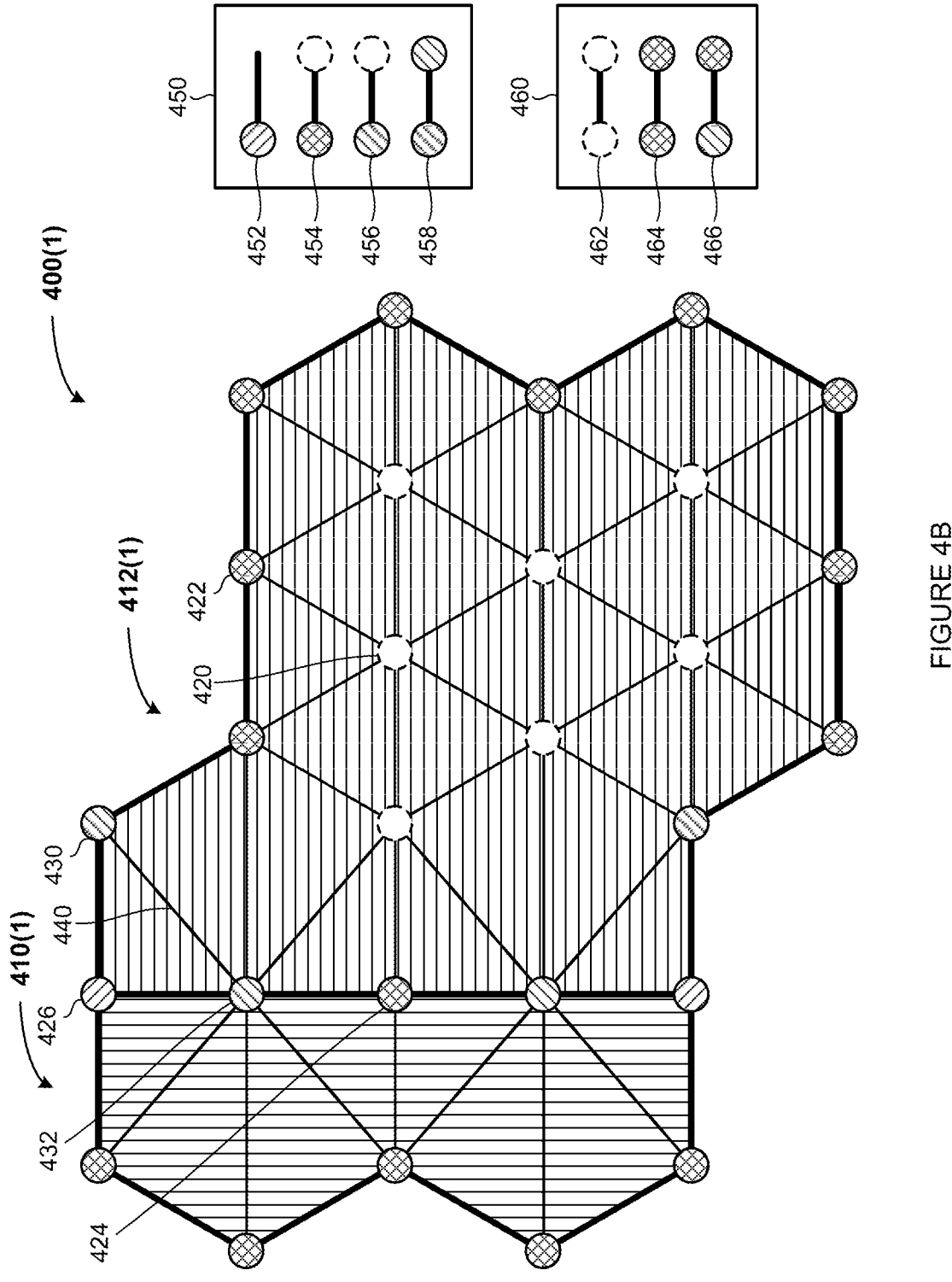

FIGS. 4A-4B illustrate selecting edges as collapse candidates, according to various embodiments. As shown in FIG. 4A, a mesh 400(0) includes a set of 36 triangles. The mesh 400(0) may be a portion of a larger mesh (not shown). The portion 410(0) on the left side of the mesh 400(0) includes 8 triangles having a first set of properties. The portion 412(0) on the right side of the mesh 400(0) includes 26 triangles having a second set of properties. The first set of properties and the second set of properties differ in at least one aspect, such as color, normal, texture map region, and/or the like. As a result, a discontinuity exists at the interface between the portion 410(0) on the left side of the mesh 400(0) and the portion 412(0) on the right side of the mesh 400(0).

As shown in FIG. 4B, in order to select edges as collapse candidates, edge collapse application 340 determines a status for each vertex included the portion 410(1) on the left side of the mesh 400(1) and the portion 412(1) on the right side of the mesh 400(1). In so doing, edge collapse application 340 determines a status for each vertex included at the interface between the portion 410(1) on the left side of the mesh 400(1) and the portion 412(1) on the right side of the mesh 400(1). The status is based on whether a vertex is located at one or more discontinuities. Edge collapse application 340 stores this status as a parameter for each of the vertices.

As shown, certain interior vertices, such as vertex 420, are not located at any discontinuities. Edge collapse application 340 stores a status as a parameter for such vertices as not located along any discontinuities. Certain exterior vertices, such as vertex 422, and interior vertices, such as vertex 424, are located at a single discontinuity. Exterior vertex 422 is located at the discontinuity at the perimeter of the mesh 400(1). Interior vertex 424 is located at the discontinuity at the interface between the portion 410(1) on the left side of the mesh 400(1) and the portion 412(1) on the right side of the mesh 400(1). Edge collapse application 340 stores a status as a parameter for such vertices as located along a single discontinuity. Certain vertices, such as vertex 426, are located at the intersection of two or more discontinuities. As shown, vertex 426 is located at the discontinuity at the perimeter of the mesh 400(1). Vertex 426 is also located at the discontinuity at the interface between the portion 410(1) on the left side of the mesh 400(1) and the portion 412(1) on the right side of the mesh 400(1). Edge collapse application 340 stores a status as a parameter for such vertices as located at the intersection of two or more discontinuities.

Certain vertices, such as vertices 430 and 432, are located at opposite endpoints of an edge, where one vertex is located along one discontinuity and the other vertex is located at a different discontinuity. As shown, vertex 430, at one endpoint of edge 440, is located at the discontinuity at the perimeter of the mesh 400(1). Vertex 432, at the other endpoint of edge 440, is located at the discontinuity at the interface between the portion 410(1) on the left side of the mesh 400(1) and the portion 412(1) on the right side of the mesh 400(1). Edge collapse application 340 stores a status as a parameter for such vertices as located opposite ends of the same edge and at different discontinuities.

In some embodiments, edge collapse application 340 preferentially collapses edges where both vertices are not located along a discontinuity, or at most one discontinuity. Edge collapse application 340 generally refrains from collapsing an edge where at least one vertex is located at the intersection of two or more discontinuities. Further, collapse application 340 generally refrains from collapsing an edge where one of the two vertices is located at a discontinuity and the other vertex is located at a different discontinuity, because collapsing such an edge would merge two discontinuities. Accordingly, edge collapse application 340 selects edges as collapse candidates according to different rules.

As shown, rule set 450 indicates certain edge types that edge collapse application 340 refrains from collapsing. Rule 452 indicates that edge collapse application 340 refrains from collapsing an edge where at least one vertex is located along two or more discontinuities, such as vertex 426. Rule 454 indicates that edge collapse application 340 refrains from collapsing an edge where one vertex is located along one discontinuity, such as vertex 422, and the other vertex is located along no discontinuities, such as vertex 420. Similarly, rule 456 indicates that edge collapse application 340 refrains from collapsing an edge where one vertex is located along one discontinuity, such as vertex 430, and the other vertex is located along no discontinuities, such as vertex 420. Rule 456 applies where the vertex located along one discontinuity, such as vertex 430, shares an edge, such as edge 440, with a vertex located at a different discontinuity, such as vertex 432. Rule 458 indicates that edge collapse application 340 refrains from collapsing an edge where the two vertices are located at opposite ends of the same edge and at different discontinuities.

As shown, rule set 460 indicates certain edge types that edge collapse application 340 may select as collapse candidates. Rule 462 indicates that edge collapse application 340 may collapse an edge where neither of the two vertices is located at a discontinuity, such as vertex 420. Rule 464 indicates that edge collapse application 340 may collapse an edge where both of the two vertices are located at the same discontinuity, such as vertex 422. Similarly, rule 466 indicates that edge collapse application 340 may collapse an edge where both of the two vertices are located at the same discontinuity. Rule 466 applies where one vertex, such as vertex 422, is located along one discontinuity and the other vertex, such as vertex 430, is located at the same discontinuity as vertex 422. Edge collapse application 340 may collapse such an edge even though vertex 430 shares an edge, such as edge 440, with a vertex located at a different discontinuity, such as vertex 432.

Figure 5A:
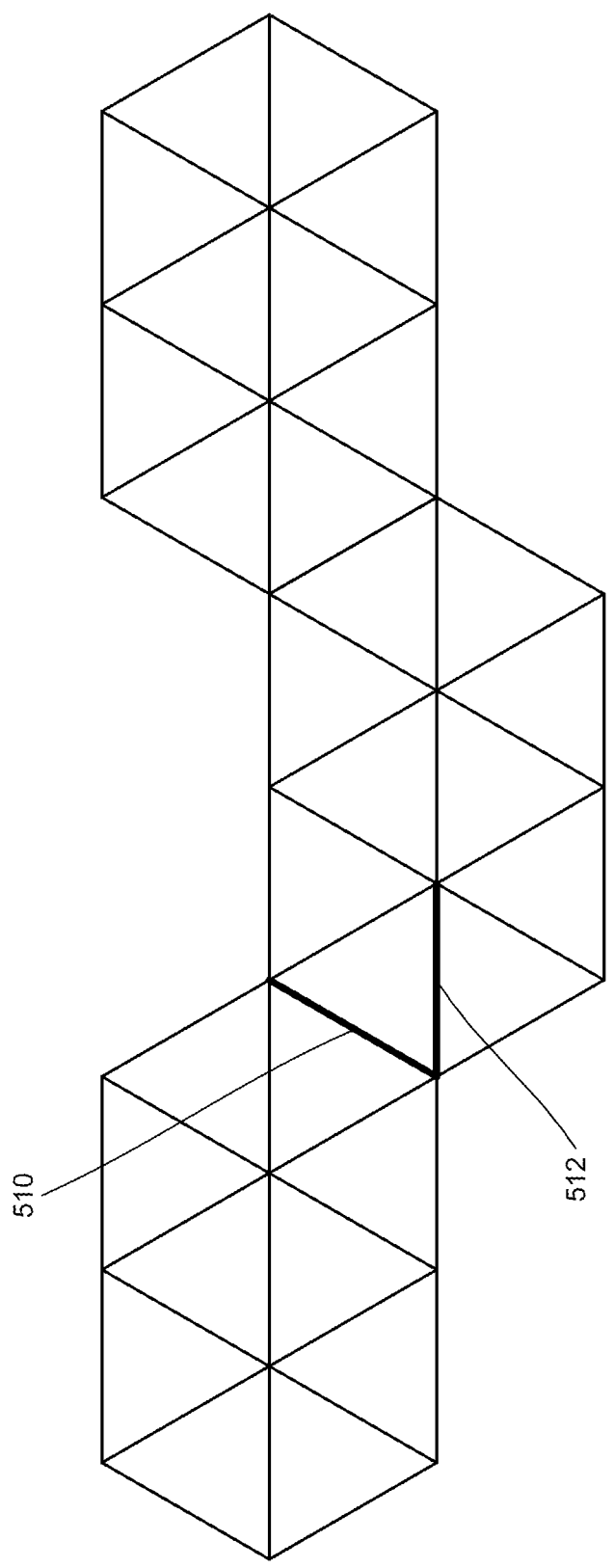
FIGS. 5A-5B illustrate parallel edge decimation by blocking neighborhood edges of a selected collapse candidate, according to various embodiments.
Figure 5B:
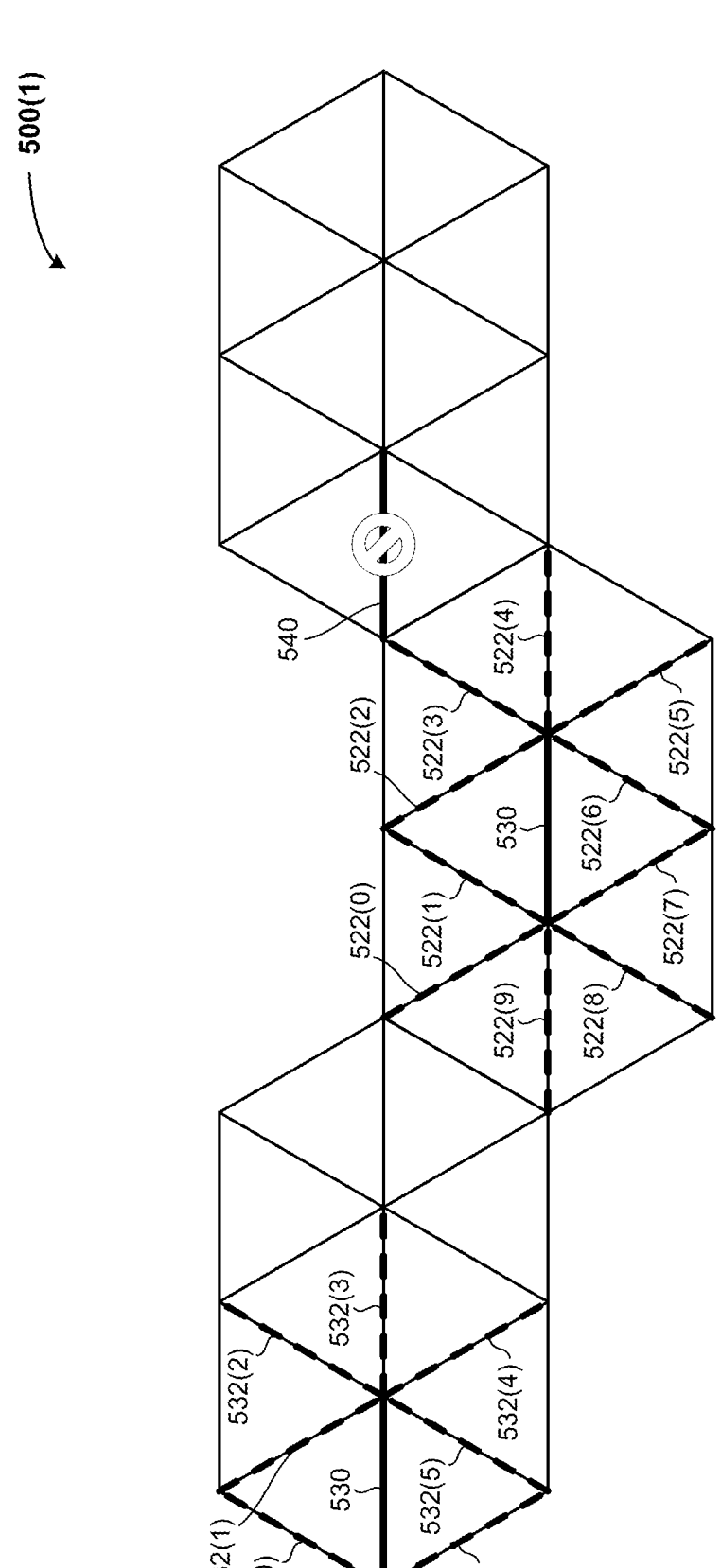

FIGS. 5A-5B illustrate parallel edge decimation by blocking neighborhood edges of a selected collapse candidate, according to various embodiments. As shown in FIG. 5A, a mesh 500(0) includes a set of 30 triangles. The mesh 500(0) may be a portion of a larger mesh (not shown). After selecting edge candidates, edge collapse application 340 determines which edges can be collapsed in parallel during a single iteration of edge decimation. If two edges that are selected as collapse candidates are sufficiently far away from one another, then the two edges can be collapsed in parallel during the same iteration of edge decimation. If, however, the two edges that are selected as collapse candidates are too close to one another, then the two edges cannot be collapsed in parallel during the same iteration of edge decimation. For example, without limitation, edge 510 is adjacent to edge 512. If edge collapse application 340 collapses edge 510 in a given iteration, then one of the vertices of edge 512 is changed or altered by the collapse of edge 510. Therefore, edge collapse application 340 is unable to collapse edge 512 in the same iteration. Similarly, if edge collapse application 340 collapses edge 512 in a given iteration, then one of the vertices of edge 510 is changed or altered by the collapse of edge 512. Therefore, edge collapse application 340 is unable to collapse edge 510 in the same iteration.

Therefore, as shown in FIG. 5B, once edge collapse application 340 selects an edge for collapse, edge collapse application 340 blocks neighboring edges of the selected edge from being collapsed in the same iteration. In some examples, without limitation, edge collapse application 340 selects collapse candidates that have an edge cost less than a threshold value. Edge collapse application 340 may determine that edge 520 has an edge cost that is less than the threshold value and, consequently, may preliminarily select edge 520 for collapse. Because no other edges have been selected for collapse, edge collapse application 340 may collapse edge 520 during the current iteration. Edge collapse application 340 marks the edges neighboring edge 520 as blocked from collapse during the current iteration. As a result, collapse application 340 marks edges 522(0)-522(9) as blocked from collapse.

Edge collapse application 340 may determine that edge 530 has an edge cost that is less than the threshold value and, consequently, may preliminarily select edge 530 for collapse. Because no other edges selected for collapse and/or blocked from collapse are adjacent to edge 530, edge collapse application 340 may collapse edge 530 during the current iteration. Edge collapse application 340 marks the edges neighboring edge 530 as blocked from collapse during the current iteration. As a result, collapse application 340 marks edges 532(0)-532(6) as blocked from collapse.

Edge collapse application 340 may determine that edge 540 has an edge cost that is less than the threshold value and, consequently, may preliminarily select edge 540 for collapse. Because edge 522(3) is blocked from collapse and is adjacent to edge 540, edge collapse application 340 may not collapse edge 540 during the current iteration.

Figure 6A:
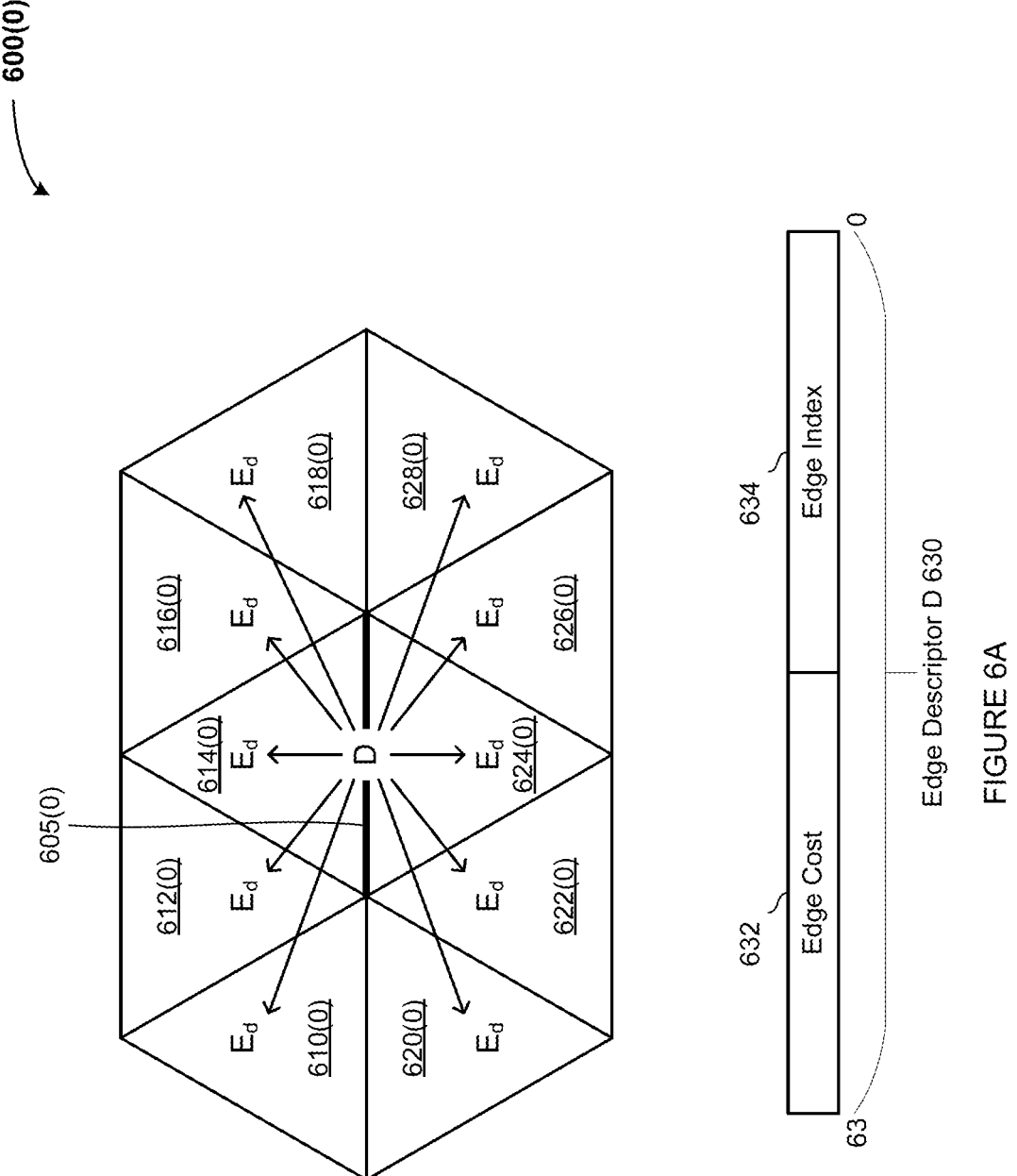
FIGS. 6A-6E illustrate performing an edge collapse operation, according to various embodiments.

FIGS. 6A-6E illustrate performing an edge collapse operation, according to various embodiments. As shown in FIG. 6A, a mesh 600(0) includes a set of ten triangles. The mesh 600(0) may be a portion of a larger mesh (not shown). Edge collapse application 340 has preliminarily selected edge 605(0) for collapse. Edge collapse application 340 propagates the edge cost descriptor D 630 for edge 605(0) to neighboring triangles 610, 612, 614, 616, 618, 620, 622, 624, 626, and 628. The edge cost descriptor D 630 includes an edge cost 632 field and an edge index 634 field. In some examples, without limitation, the edge cost descriptor D 630 is a 64-bit unsigned integer, where the 32 MSBs are the binary representation of the edge cost 632 and the 32 LSBs are the binary representation of the edge index 634. Edge collapse application 340 propagates the edge cost descriptor D 630 to neighboring triangles by copying the edge cost descriptor D 630 for the edge 605(0) to triangles 610, 612, 614, 616, 618, 620, 622, 624, 626, and 628.

Edge collapse application 340 similarly propagates the edge cost descriptors for other edges selected as collapse candidate by copying the respective edge cost descriptors to corresponding neighboring triangles. Upon completing the propagation of edge cost descriptors for the set of collapse candidates, edge collapse application 340 determines whether the edge cost descriptor D 630 for edge 605(0) is equal to the edge cost descriptors for neighboring triangles 610, 612, 614, 616, 618, 620, 622, 624, 626, and 628. If the edge cost descriptor D 630 for edge 605(0) is different from one or more of the edge cost descriptors for neighboring triangles 610, 612, 614, 616, 618, 620, 622, 624, 626, and 628, then another nearby edge is determined to be a better candidate for collapse, and that edge has blocked edge 605(0) from collapse during the current iteration. If, however, the edge cost descriptor D 630 for edge 605(0) is equal to the edge cost descriptors for all of neighboring triangles 610, 612, 614, 616, 618, 620, 622, 624, 626, and 628, then edge 605(0) may be collapsed during the current iteration.

Figure 6B:
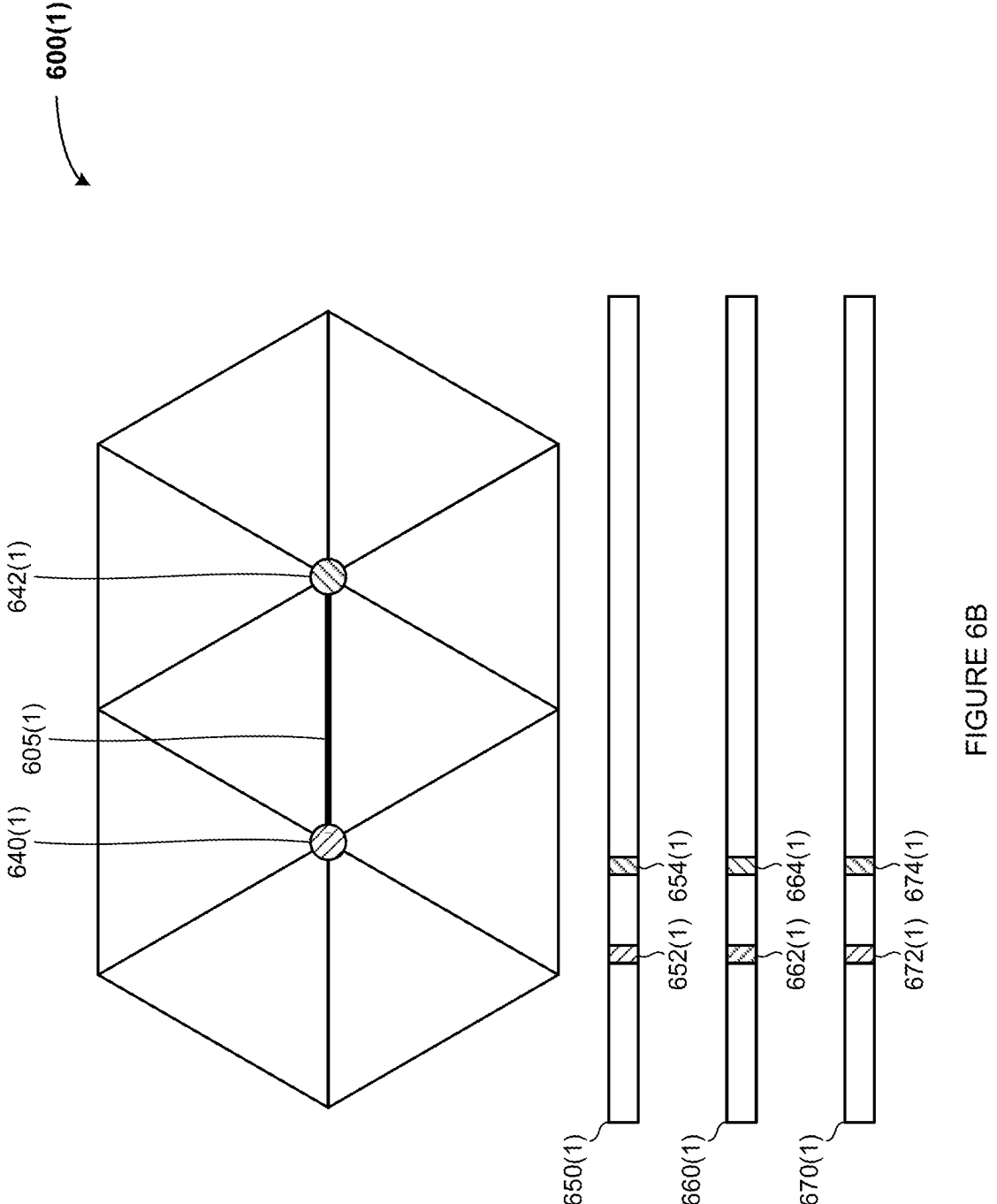

As shown in FIG. 6B, edge collapse application 340 selects edge 605(1) for collapse, where edge 605(1) has two endpoint vertices 640(1) and 642(1). Indices and attributes for vertex 640(1) are stored in one or more of element 652(1) of the index buffer 650(1), element 662(1) of the location index buffer 660(1), and element 672(1) of the vertex buffer 670(1). Similarly, indices and attributes for vertex 642(1) are stored in one or more of element 654(1) of the index buffer 650(1), element 664(1) of the location index buffer 660(1), and element 674(1) of the vertex buffer 670(1).

Figure 6C:
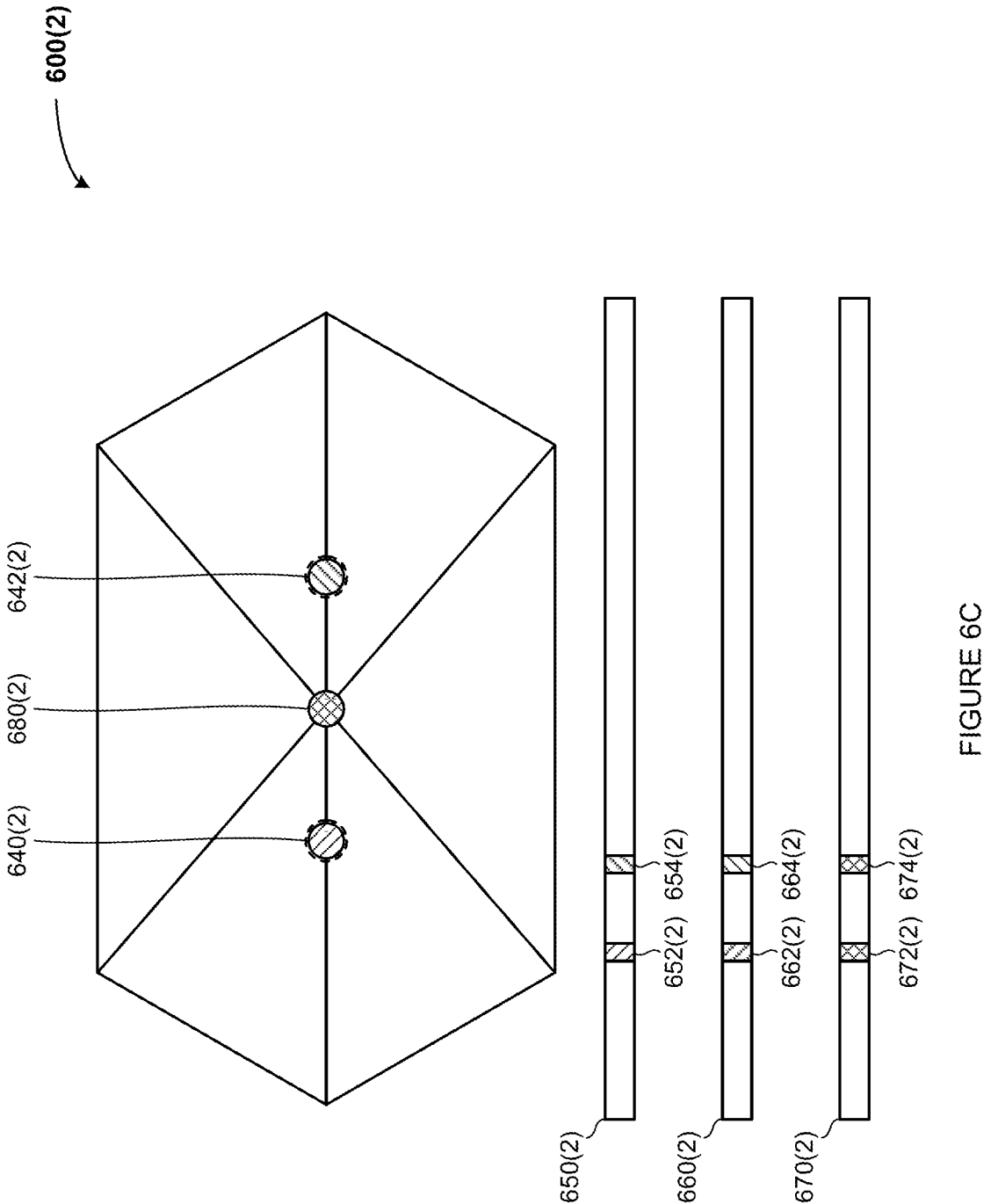

As shown in FIG. 6C, edge collapse application 340 collapses the edge by merging vertices 640(2) and 642(2) resulting in a merged vertex 680(2). The merged vertex 680(2) is at a merged position at the midpoint between the original vertices 640(2) and 642(2) of the collapsed edge. Additionally or alternatively, edge collapse application 340 merges the vertices 640(2) and 642(2) of the collapsed edge, resulting in a merged vertex 680(2) at the position of vertex 640(2), a merged vertex 680(2) at the position of vertex 642(2), a merged vertex 680(2) at any suitable position between positions of vertices 640(2) and 642(2), and/or the like. Edge collapse application 340 interpolates the vertex attributes of the original vertices 640(2) and 642(2) of the collapsed edge to generate the attributes of this merged vertex 680(2). Edge collapse application 340 updates the mesh by propagating the interpolated vertex attributes of the original vertices 640(2) and 642(2) to each of elements 672(2) and 674(2) of the vertex buffer 670(2).

Figure 6D:
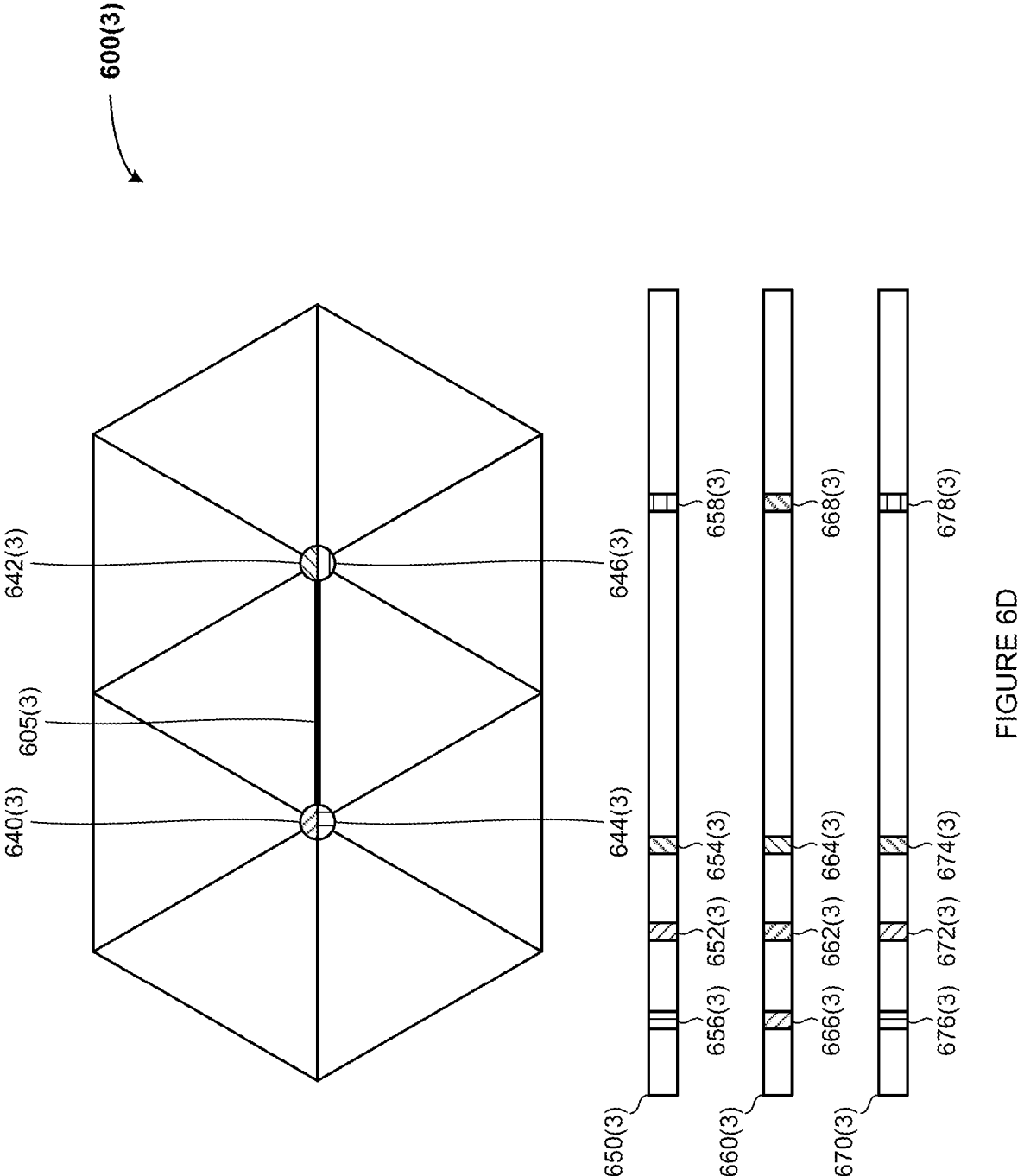

As shown in FIG. 6D, edge collapse application 340 selects edge 605(3) for collapse, where edge 605(3) is located at a discontinuity. Therefore, edge 605(3) is associated with four vertices 640(3), 642(3), 644(3), and 646(3). Vertices 640(3) and 642(3) represent the attributes associated with the edge 605(3) above the discontinuity. Indices and attributes for vertex 640(3) are stored in one or more of element 652(3) of the index buffer 650(3), element 662(3) of the location index buffer 660(3), and element 672(3) of the vertex buffer 670(3). Similarly, indices and attributes for vertex 642(3) are stored in one or more of element 654(3) of the index buffer 650(3), element 664(3) of the location index buffer 660(3), and element 674(3) of the vertex buffer 670(3). Likewise, vertices 644(3) and 646(3) represent the attributes associated with the edge 605(3) below the discontinuity. Indices and attributes for vertex 644(3) are stored in one or more of element 656(3) of the index buffer 650(3), element 666(3) of the location index buffer 660(3), and element 676(3) of the vertex buffer 670(3). Similarly, indices and attributes for vertex 646(3) are stored in one or more of element 658(3) of the index buffer 650(3), element 668(3) of the location index buffer 660(3), and element 678(3) of the vertex buffer 670(3).

Figure 6E:
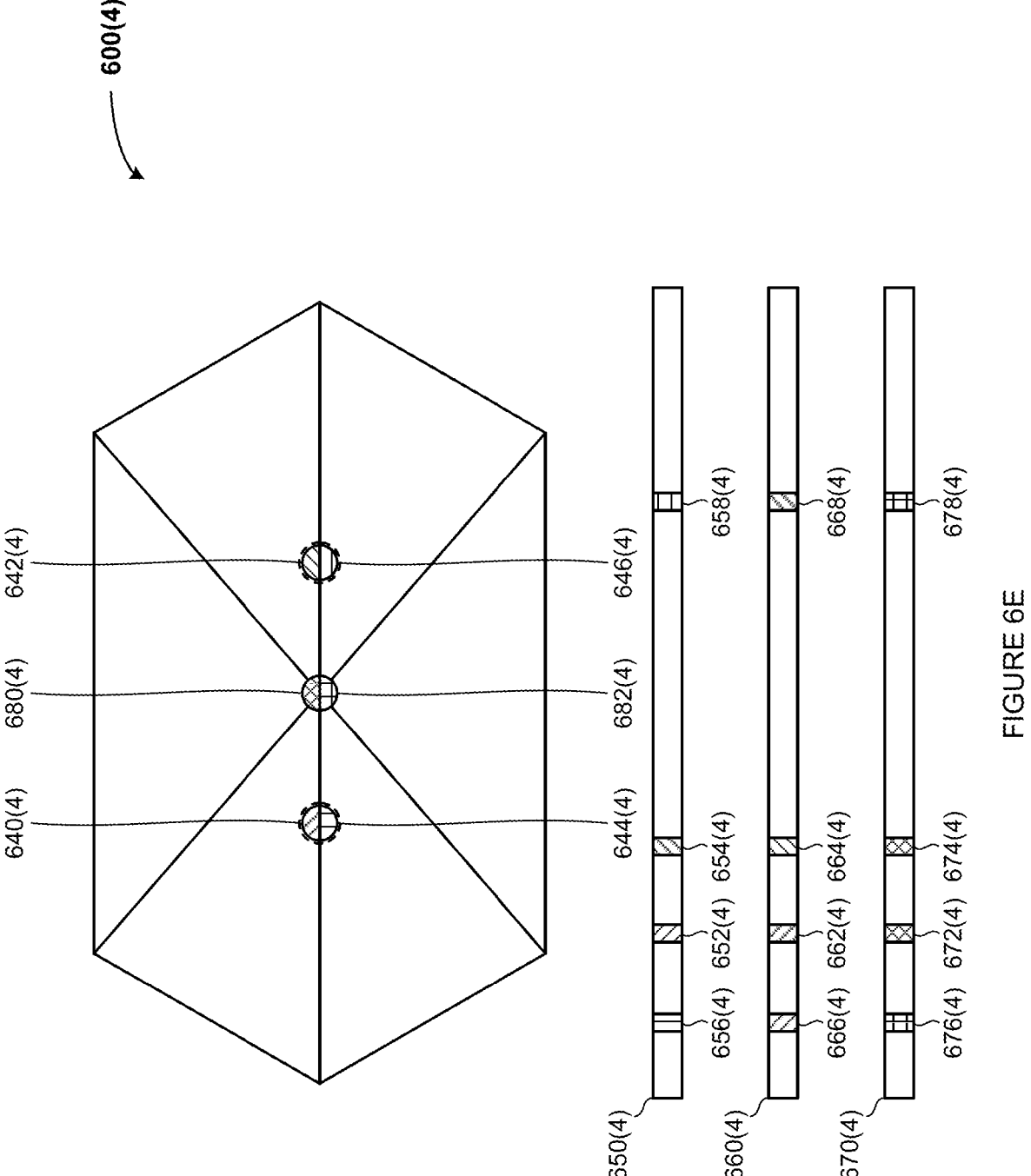

As shown in FIG. 6E, edge collapse application 340 collapses the edge by merging vertices 640(4) and 642(4) resulting in a merged vertex 680(4). The merged vertex 680(4) is at a merged position at the midpoint between the original vertices 640(4) and 642(4) of the collapsed edge. Additionally or alternatively, the merged vertex 680(4) may be at the position of vertex 640(4), at the position of vertex 642(4), at any suitable position between positions of vertices 640(4) and 642(4), and/or the like. Edge collapse application 340 interpolates the vertex attributes of the original vertices 640(4) and 642(4) of the collapsed edge to generate the attributes of this merged vertex 680(4). Edge collapse application 340 updates the mesh by propagating the interpolated vertex attributes of the original vertices 640(4) and 642(4) to each of elements 672(4) and 674(4) of the vertex buffer 670(4).

Further, edge collapse application 340 collapses the edge by merging vertices 644(4) and 646(4) resulting in a merged vertex 682(4). The merged vertex 682(4) is at a merged position at the midpoint between the original vertices 644(4) and 646(4) of the collapsed edge. Additionally or alternatively, the merged vertex 682(4) may be at the position of vertex 644(4), at the position of vertex 646(4), at any suitable position between positions of vertices 644(4) and 646(4), and/or the like. Edge collapse application 340 interpolates the vertex attributes of the original vertices 644(4) and 646(4) of the collapsed edge to generate the attributes of this merged vertex 682(4). Edge collapse application 340 updates the mesh by propagating the interpolated vertex attributes of the original vertices 644(4) and 646(4) to each of elements 676(4) and 678(4) of the vertex buffer 670(4).

Figure 7A:
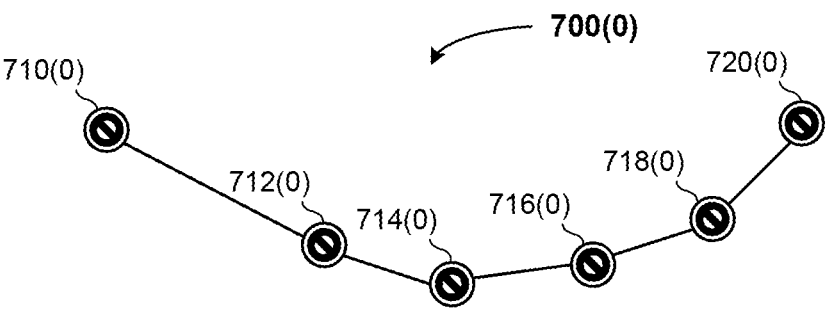
FIGS. 7A-7E illustrate preserving vertex history while performing a series of edge collapse operations, according to various embodiments.
Figure 7B:
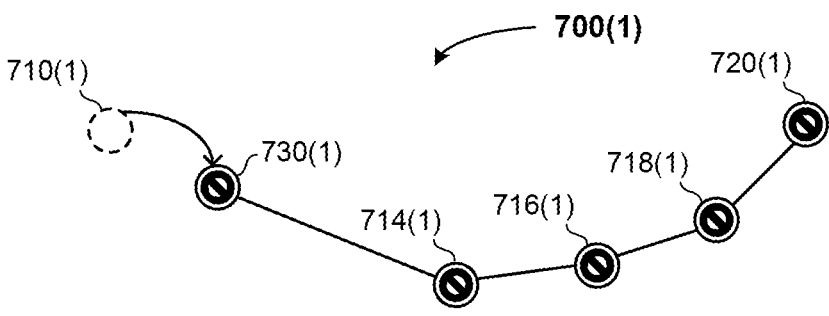

FIGS. 7A-7E illustrate preserving vertex history while performing a series of edge collapse operations, according to various embodiments. As shown in FIG. 7A, a mesh 700(0) includes six vertices 710(0), 712(0), 714(0), 716(0), 718(0), and 720(0) connected by edges. The mesh 700(0) may be a portion of a larger mesh (not shown). As shown in FIG. 7B, edge collapse application 340 collapses an edge by merging vertices 710(1) and 712(1), resulting in a merged vertex 730(1). Merged vertex 730(1) is modified version of surviving vertex 712(1). Edge collapse application 340 preserves the history of the collapsed edge by generating a pointer to the merged vertex 730(1) from ancestor vertex 710(1), which edge collapse application 340 has removed from mesh 700(1). As used herein, an ancestor vertex is one of the two vertices of a collapsed edge that results in a merged vertex. After the collapse, the mesh 700(1) includes five vertices 730(1), 714(1), 716(1), 718(1), and 720(1) connected by edges.

Figure 7C:
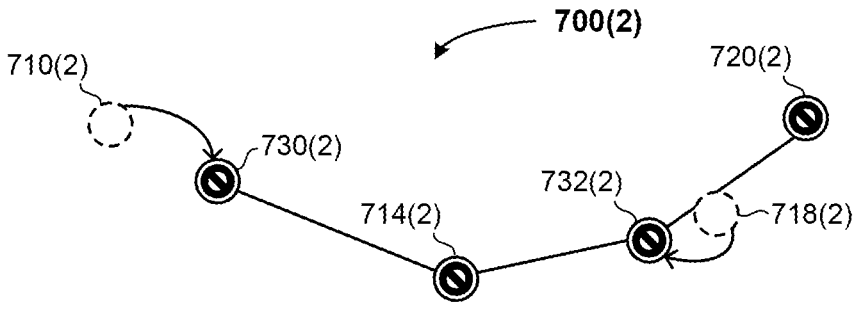

As shown in FIG. 7C, edge collapse application 340 collapses an edge by merging vertices 716(2) and 718(2), resulting in a merged vertex 732(2). Merged vertex 732(2) is modified version of surviving vertex 716(2). Edge collapse application 340 preserves the history of the collapsed edge by generating a pointer to the merged vertex 732(2) from ancestor vertex 718(2), which edge collapse application 340 has removed from mesh 700(2). After the collapse, the mesh 700(2) includes four vertices 730(2), 714(2), 732(2), and 720(2) connected by edges.

Figure 7D:
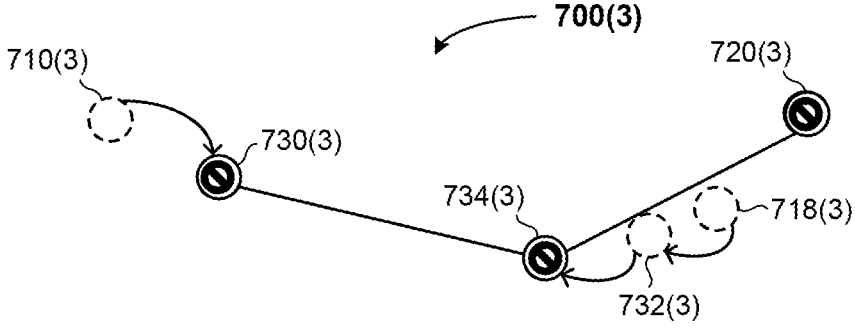

As shown in FIG. 7D, edge collapse application 340 collapses an edge by merging vertices 714(3) and 732(3), resulting in a merged vertex 734(3). Merged vertex 734(3) is modified version of surviving vertex 714(3). Edge collapse application 340 preserves the history of the collapsed edge by generating a pointer to the merged vertex 734(3) from ancestor vertex 732(3), which edge collapse application 340 has removed from mesh 700(3). Ancestor vertex 718(3) continues to point to the merged vertex 732(2). After the collapse, the mesh 700(3) includes three vertices 730(3), 734(3), and 720(3) connected by edges.

Figure 7E:
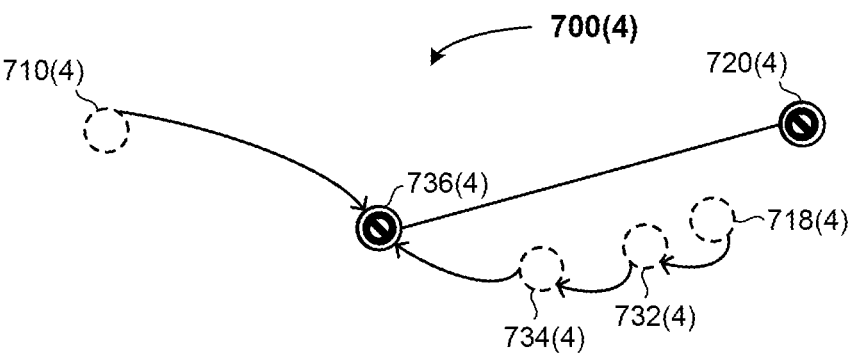

As shown in FIG. 7E, edge collapse application 340 collapses an edge by merging vertices 730(4) and 734(4), resulting in a merged vertex 736(4). Merged vertex 736(4) is modified version of surviving vertex 730(4). Edge collapse application 340 preserves the history of the collapsed edge by generating a pointer to the merged vertex 736(4) from ancestor vertex 710(4), which edge collapse application 340 has previously removed from mesh 700(1) of FIG. 7B. In addition, edge collapse application 340 further preserves the history of the collapsed edge by generating a pointer to the merged vertex 736(4) from ancestor vertex 734(4), which edge collapse application 340 has removed from mesh 700(4). Ancestor vertex 732(4) continues to point the merged vertex 734(4). Ancestor vertex 718(4) continues to point the merged vertex 732(4). After the collapse, the mesh 700(4) includes two vertices 736(4) and 720(4) connected by an edge.

In this manner, edge collapse application 340 maintains linked lists of ancestor vertices from the original mesh and/or from intermediate simplified meshes to the resulting simplified mesh. In so doing, the disclosed techniques preserve the history of how the edge decimation process displaces the vertices of the original mesh 700(0) to generate the simplified mesh 700(4). Accordingly, the results of the computational geometry techniques as applied to the simplified mesh 700(4) can be propagated back to the original mesh 700(0). Further, edge collapse application 340 may use the preserved history to determine, for each triangle in the simplified mesh 700(4), how may vertices of the original mesh 700(0) are encompassed by the triangle in the simplified mesh 700(4). In addition, edge collapse application 340 may use the preserved history to determine, for each triangle in the simplified mesh 700(4), the minimum displacement and the maximum displacement applied to the vertices of the original mesh 700(0) relative to the corresponding vertex in the simplified mesh 700(4).

Figure 8A:
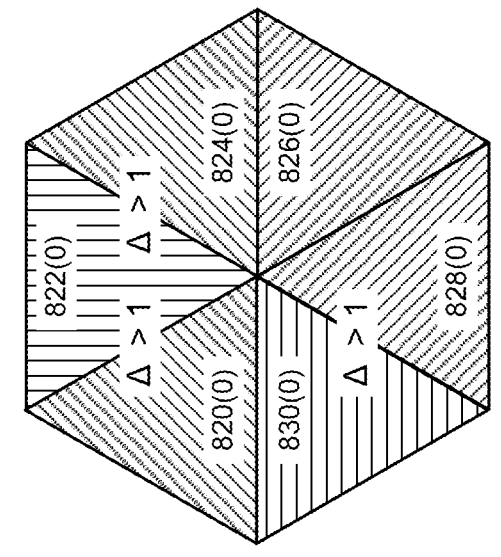
FIGS. 8A-8D illustrate performing an edge collapse operation using micromesh metadata, according to various embodiments.
Figure 8A:
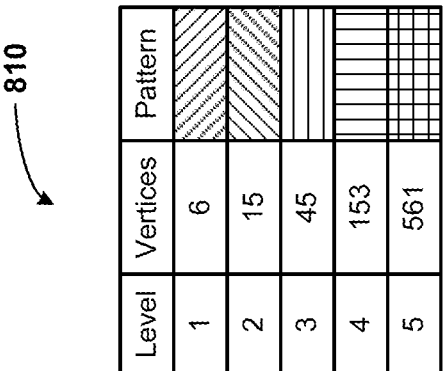

FIGS. 8A-8D illustrate performing an edge collapse operation using micromesh metadata, according to various embodiments. As shown in FIG. 8A, a simplified mesh 800(0) includes six triangles in the form of a triangle fan. The simplified mesh 800(0) may be a portion of a larger mesh (not shown). In some examples, without limitation, edge collapse application 340 may perform stitching operations between two triangles of the simplified mesh, where one triangle encompasses a different number of vertices from the original mesh relative to the other triangle. To prepare for such a stitching operation, edge collapse application 340 uses the preserved history described in conjunction with FIG. 7 to determine how may vertices of the original mesh are encompassed by each triangle in the simplified mesh. Edge collapse application 340 determines a subdivision level for each triangle in the simplified mesh based on the number of vertices from the original mesh encompassed by the triangle.

As shown in FIG. 8A, legend 810 indicates subdivision level 1 identifies a triangle in the simplified mesh that encompasses up to 6 vertices from the original mesh. Subdivision level 2 identifies a triangle in the simplified mesh that encompasses more than 6 vertices and up to 15 vertices from the original mesh. Subdivision level 3 identifies a triangle in the simplified mesh that encompasses more than 15 vertices and up to 45 vertices from the original mesh. Subdivision level 4 identifies a triangle in the simplified mesh that encompasses more than 45 vertices and up to 153 vertices from the original mesh. Subdivision level 5 identifies a triangle in the simplified mesh that encompasses more than 153 vertices and up to 561 vertices from the original mesh. In some embodiments, without limitation, edge collapse application 340 may apply alternative and/or additional subdivision levels.

Applying the subdivision levels of legend 810 to the simplified mesh 800(0), edge collapse application 340 determines that triangles 826(0) and 828(0) are in subdivision level 1, triangles 820(0) and 824(0) are in subdivision level 2, triangle 830(0) is in subdivision level 3, and triangle 822(0) is in subdivision level 4. Once each triangle is assigned a subdivision level, edge collapse application 340 determines whether stitching is needed between adjacent triangles and, if stitching is needed, whether stitching is feasible between the adjacent triangles. If adjacent triangles have the same subdivision level, then no stitching, or minimal stitching, is needed. If adjacent triangles differ by one subdivision level, then stitching is needed and is feasible. If adjacent triangles differ by more than one subdivision level, then the resolution between the adjacent triangles is sufficiently different such that stitching, although needed, is not feasible.

Applying these rules to the simplified mesh 800(0), triangles 826(0) and 828(0) are adjacent and have the same subdivision level. Therefore, no stitching, or minimal stitching, is needed. Triangles 824(0) and 826(0) are adjacent and differ by one subdivision level. Therefore, stitching is needed and is feasible. Likewise, triangles 820(0) and 830(0) are adjacent and differ by one subdivision level. Therefore, stitching is needed and is feasible. Triangles 824(0) and 826(0) are adjacent and differ by one subdivision level. Therefore, stitching is needed and is feasible.

Triangles 820(0) and 822(0) are adjacent and differ by two subdivision levels. Therefore, stitching is needed but is not feasible. Likewise, triangles 822(0) and 824(0) are adjacent and differ by two subdivision levels. Therefore, stitching is needed but is not feasible. Triangles 828(0) and 830(0) also are adjacent and differ by two subdivision levels. Therefore, stitching is needed but is not feasible.

Figure 8B:
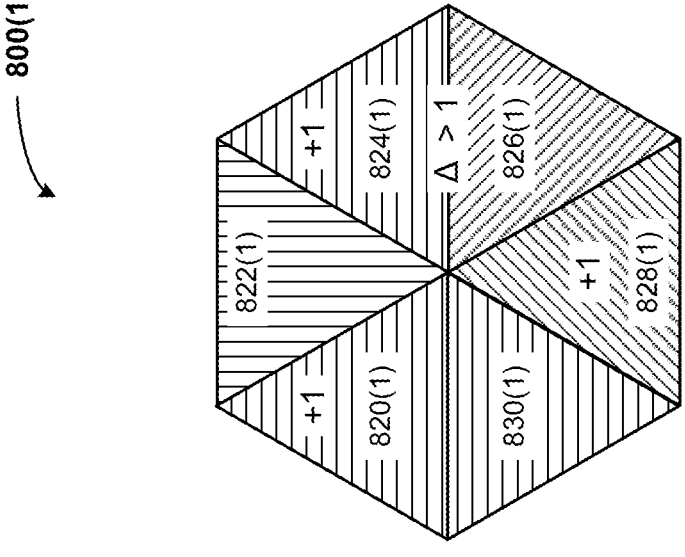

As shown in FIG. 8B, to prepare for the simplified mesh 800(1) for stitching, edge collapse application 340 may increase the subdivision level of certain triangles using the preservation history described in conjunction with FIG. 7. Edge collapse application 340 increased the subdivision level of triangles 820(1) and 824(1) from subdivision level 2 to subdivision level 3. Similarly, edge collapse application 340 increased the subdivision level of triangle 828(1) from subdivision level 1 to subdivision level 2. As modified, triangles 820(1) and 830(1) are now at the same subdivision level, and no stitching, or minimal stitching, is needed. A single subdivision level now separates triangles 820(1) and 822(1), triangles 822(1) and 824(1), triangles 826(1) and 828(1), and triangles 828(1) and 830(1). However, triangles 824(1) and 826(1) still differ by more than one subdivision level.

Figure 8C:
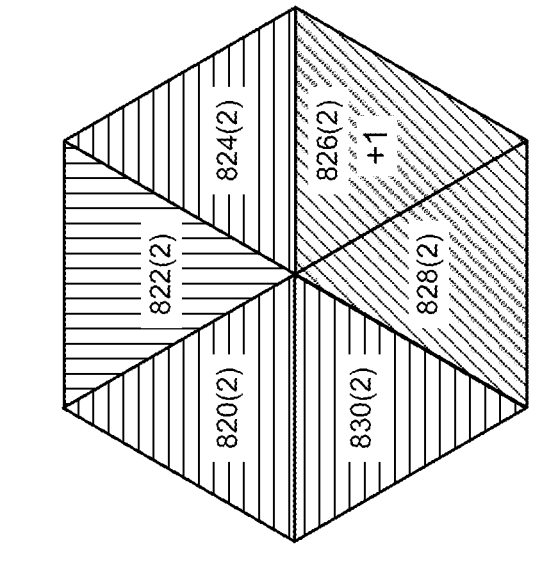

As shown in FIG. 8C, edge collapse application 340 performs another iteration of increasing the subdivision level of certain triangles using the preservation history described in conjunction with FIG. 7. Edge collapse application 340 increased the subdivision level of triangle 826(2) from subdivision level 1 to subdivision level 2. As a result, no pair of adjacent triangles differ by more than one subdivision level. Triangles 820(2) and 820(2) have the same subdivision level, and triangles 826(2) and 828(2) also have the same subdivision level. A single subdivision level now separates triangles 820(2) and 822(2), triangles 822(2) and 824(2), triangles 824(2) and 826(2), and triangles 828(2) and 830(2). As a result, simplified mesh 800(2) is now ready for stitching.

Figure 8D:
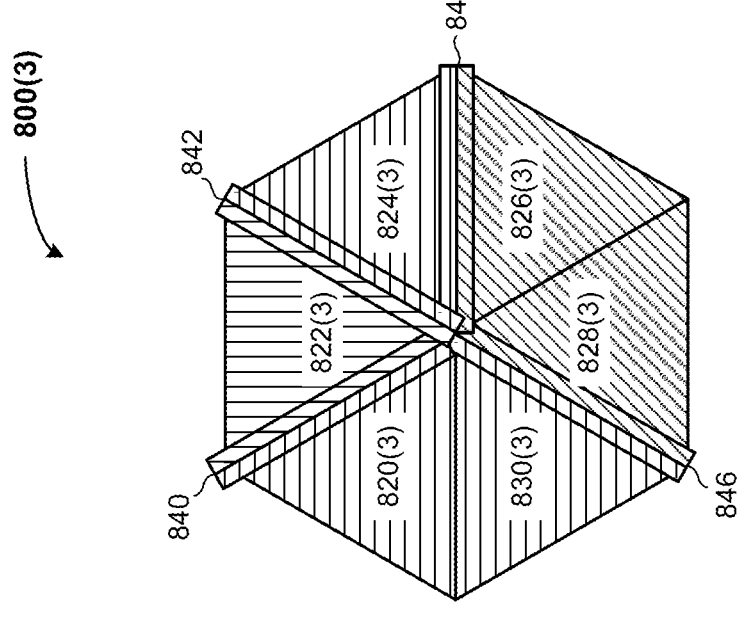

As shown in FIG. 8D, triangle 820(3) is at subdivision level 3 and triangle 822(3) is at subdivision level 4. Edge collapse application 340 stitches triangles 820(3) and 822(3) together by generating stitching region 840. Triangle 822(3) is at subdivision level 4 and triangle 824(3) is at subdivision level 3. Edge collapse application 340 stitches triangles 822(3) and 824(3) together by generating stitching region 842. Triangle 824(3) is at subdivision level 3 and triangle 826(3) is at subdivision level 2. Edge collapse application 340 stitches triangles 824(3) and 826(3) together by generating stitching region 844. Triangle 826(3) and triangle 828(3) are both at subdivision level 2. Therefore, edge collapse application 340 does not generate a stitching region for this pair of triangles. Triangle 828(3) is at subdivision level 2 and triangle 830(3) is at subdivision level 3. Edge collapse application 340 stitches triangles 828(3) and 830(3) together by generating stitching region 846. Triangle 830(3) and triangle 820(3) are both at subdivision level 3. Therefore, edge collapse application 340 does not generate a stitching region for this pair of triangles.

FIG. 9 is a flow diagram of method steps for performing parallel edge decimation by the computing system 100 of FIG. 1, according to various embodiments. The method steps may be performed by CPU 102, parallel processing subsystem 112, and/or the like. Additionally or alternatively, the method steps may be performed by one or more processing units and/or alternative parallel processors including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-8D, persons of ordinary skill in the art will understand that any system configured to perform the method steps, in any order, is within the scope of the present disclosure.

As shown, a method 900 begins at operation 902, where a processing unit, such as one or more CPUs 102 and/or one or more PPUs 202, generates, for each edge in a plurality of edges of a mesh, an edge cost representative of an amount of change on the mesh if the edge is collapsed. In various embodiments, the mesh may be a 2D mesh, a 3D mesh, and/or the like. In some non-limiting examples, the processing unit may generate edge cost by a method that uses an error metric based on quadrics representing the local curvature of the mesh at each vertex. In some non-limiting examples, the processing unit may generate the local curvature values using ray tracing. With this ray tracing technique, the processing unit determines a count of the number of rays originating at the position of the vertex and in pseudorandom directions that intersect, or hit, a surface within a sphere that has a user-defined radius around the position of the vertex.

At operation 904, the processing unit selects, based on the edge costs, a subset of edges from the plurality of edges that are collapse candidates. For example, without limitation, based on the edge costs generated in operation 902, the processing unit selects candidate edges for collapse by reducing the number of geometric primitives in the mesh while avoiding damage to the mesh topology. In various embodiments, an edge linked to two vertices is considered a collapse candidate if: (1) the edge is linked to at most two triangles; (2) the edge cost is less than a user-defined maximum cost threshold; and (3) one of three criteria is satisfied. These three criteria are: (1) both of the vertices linked to the edge are along a discontinuity; (2) neither of the vertices linked to the edge is along a discontinuity; or (3) one of the vertices linked to the edge is along a discontinuity and the other vertex linked to the edge is adjacent to more than one discontinuity. The processing unit adds the collapse candidates to a selected edge buffer and atomically increments the select count of the number of selected edges upon each addition to the selected edge buffer.

At operation 906, the processing unit propagates, for each edge in the subset of edges, the edge cost to triangles that neighbor the edge. For example, without limitation, for a given edge, the processing unit iterates over each triangle adjacent to either of the two vertices linked to the edge. The processing unit replaces the edge cost descriptor for a given adjacent triangle by the generated edge cost descriptor if the generated edge cost descriptor is less than the currently stored edge cost descriptor. In some embodiments, the processing unit performs this edge cost descriptor replacement operation in a single atomic step using an atomic minimum operation.

At operation 908, the processing unit determines, for a first edge in the subset of edges, that a first edge cost for the first edge is stored in an edge buffer associated with the triangles that neighbor the first edge. If the edge cost descriptor for the adjacent triangle and the first edge are equal for all adjacent triangles, then the processing unit determines that the edge is the edge with the minimal cost within the area of influence of a collapse operation. In such cases, the processing unit may collapse the edge without affecting other collapse operations.

At operation 910, the processing unit collapses the first edge to generate a modified mesh that does not include the first edge. Based on the identified collapsed vertices, the processing unit performs the edge collapse operation. The processing unit performs an edge collapse operation using one or more techniques. In some non-limiting examples, edge collapse application 340 merges the vertices located at the positions of the two endpoints of the collapsed edge, resulting in a merged position at the midway point between the original vertices of the collapsed edge according to the formula. The processing unit interpolates the vertex attributes of the two vertices at the positions of the endpoints of the collapsed edge to generate the attributes of this new vertex at the merged position. The processing unit updates the mesh by propagating the removal of the vertices located at the positions of the two endpoints of the collapsed edge and the addition of new vertex at the merged position and updates the topological data for the mesh accordingly.

The method 900 then terminates. In some embodiments, the processing unit generates updated topological data based on the simplified mesh. The processing unit performs operations 902 through 910 on the simplified mesh to generate a second simplified mesh. The processing unit generates updated topological data based on the second simplified mesh. The processing unit performs operations 902 through 910 on the second simplified mesh to generate a third simplified mesh, and so on, until a threshold is reached with respect to the mesh, such as a number of iterations of operations 902 through 910, a mesh with no more than a maximum number of geometric primitives, a minimum percentage reduction in the number of geometric primitives included in the mesh, and/or the like.

As described herein, edge decimation reduces a large mesh with fine resolution is reduced to a simpler mesh for certain applications. In computer animation contexts, a high-resolution mesh may be used when an animated character is near to the front of a viewing surface, such as near the screen during an animated film or near to the point of view of a player of a video game. However, this high-resolution mesh is not necessary when the animated character is at a medium range or far away from the viewer. In such cases, the mesh may be simplified to a lower resolution. For example, without limitation, a high-resolution mesh containing 35 million triangles may be used when an animated character is near to the front of a viewing surface, and a low-resolution mesh containing 30,000 triangles may be used when an animated character is far away.

In addition, applying computational geometry techniques directly to a high resolution mesh with fine detail can be computationally intensive, resulting in long latency. Therefore, edge decimation may be performed so that certain computational geometry techniques can be efficiently applied to a simpler mesh. In doing so, the disclosed techniques preserve the history of how the edge decimation process displaces the vertices of the original mesh in order to generate the simplified mesh. As a result, the results of the computational geometry techniques as applied to the simplified mesh can be propagated back to the original mesh.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In sum, various embodiments include techniques for performing parallel edge decimation on a high resolution mesh by collapsing multiple edges in parallel by blocking only the neighbor edges of the collapse candidates. Effectively, the disclosed techniques dynamically partition the mesh into small partitions around the collapse candidates. In this manner, the techniques identify all the edges that may be independently collapsed in a single, now parallel, iteration.

Further, some meshes have very high resolution and fine detail, such that applying computational geometry techniques directly to such a high resolution mesh can be computationally intensive, resulting in long latency. For example, without limitation, characters, scene objects, and sets in an animated feature film can have high resolution meshes in order to accurately present fine details on a large movie theater screen. In gaming applications, a high resolution mesh of an object may be appropriate with the object is near the user, whereas a simplified lower resolution mesh may be appropriate when the object is far away from the user. Therefore, edge decimation may be performed so that certain computational geometry techniques can be efficiently applied to a simpler mesh. In so doing, the disclosed techniques preserve the history of how the edge decimation process displaces the vertices of the original mesh to generate the simplified mesh. As a result, the results of the computational geometry techniques as applied to the simplified mesh can be propagated back to the original mesh.

At least one technical advantage of the disclosed techniques relative to the prior art is that, upon selecting an edge for collapse, the techniques restrict only a small set of additional edges in the neighborhood of the selected edge as being ineligible to collapse in the same iteration. Further, multiple edges may be selected for collapse in the same iteration, so long as no two edges being collapsed in a given iteration have intersecting neighborhoods. In this manner, the techniques may maximize the number of collapse operations per iteration and do not have the limitations of prior partitioning techniques. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific non-limiting examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, without limitation, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:

generating, for at least one edge in a plurality of edges of a mesh, a corresponding edge cost representative of an amount of change on the mesh if the edge is collapsed;

selecting, based on at least one edge cost corresponding to a given edge in the plurality of edges, a plurality of collapse candidates from the plurality of edges;

propagating, for at least one edge in the plurality of collapse candidates, the edge cost to triangles that neighbor the edge;

determining, for a first edge in the plurality of collapse candidates, that a first edge cost for the first edge is stored in an edge buffer associated with the triangles that neighbor the first edge; and collapsing the first edge to generate a modified mesh that does not include the first edge.

2. The method of claim 1, wherein the edge cost is based at least on a difference between a first position of a first vertex of the edge and a second position of a second vertex of the edge.

3. The method of claim 1, wherein the edge cost is based at least on a local curvature.

4. The method of claim 3, wherein the local curvature is based at least on a maximum of a first curvature at a first vertex of the edge and a second curvature at a second vertex of the edge.

5. The method of claim 1, wherein the edge cost is based at least on a vertex valence.

6. The method of claim 5, wherein the vertex valence is based at least on a sum of a first valence of a first vertex of the edge and a second valence of a second vertex of the edge.

7. The method of claim 5, wherein the edge cost is based on at least one of a first importance value of a local curvature or a second importance of the vertex valence.

8. The method of claim 1, further comprising determining that a first collapse candidate of the plurality of collapse candidates is linked to a maximum of two geometric primitives included in a plurality of geometric primitives in the mesh.

9. The method of claim 1, further comprising determining that the edge cost for a first collapse candidate of the plurality of collapse candidates is less than a threshold value.

10. The method of claim 1, further comprising determining that both a first vertex of a first collapse candidate of the plurality of collapse candidates and a second vertex of the first collapse candidate are along a discontinuity of the mesh.

11. The method of claim 1, further comprising determining that neither a first vertex of the edge nor a second vertex of a first collapse candidate of the plurality of collapse candidates is along a discontinuity of the mesh.

12. The method of claim 1, further comprising determining that a first vertex of a first collapse candidate of the plurality of collapse candidates is along a discontinuity of the mesh and a second vertex of the collapse candidate is adjacent to more than one discontinuity.

13. The method of claim 1, wherein propagating the edge cost to triangles that neighbor the edge comprises, for at least one triangle that neighbors the edge, storing the edge cost in a triangle edge cost associated with the triangle.

14. The method of claim 13, wherein storing the edge cost in the triangle edge cost is performed using an atomic minimum operation.

15. The method of claim 1, further comprising, subsequent to collapsing the first edge to generate the modified mesh, building a topology for the modified mesh.

16. The method of claim 1, further comprising storing, for at least one edge in the plurality of edges, an edge identifier along with an associated edge cost.

17. The method of claim 16, wherein selecting the plurality of collapse candidates from the plurality of edges comprises determining, for the first edge in the plurality of collapse candidates, that the edge cost stored with the edge identifier for the first edge is not greater than any edge cost stored with edge identifiers for edges that are neighbors of the first edge.

18. The method of claim 16, wherein the edge identifier comprises at least one of an index of an element in an array of edge costs or an identifier computed from positions of a first vertex of the edge and a second vertex of the edge.

19. The method of claim 16, wherein the edge identifier comprises an integer value that is based at least on at least edge cost, such that the edge identifier and edge cost can be updated atomically using a single atomic operation.

20. A processor, comprising:

one or more circuits to:

generate, for at least one edge in a plurality of edges of a mesh, a corresponding edge cost representative of an amount of change on the mesh if the edge is collapsed;

select, based on at least one edge cost corresponding to a given edge in the plurality of edges, a plurality of collapse candidates from the plurality of edges;

propagate, for at least one edge in the plurality of collapse candidates, the edge cost to triangles that neighbor the edge;

determine, for a first edge in the plurality of collapse candidates, that a first edge cost for the first edge is stored in an edge buffer associated with the triangles that neighbor the first edge; and collapse the first edge to generate a modified mesh that does not include the first edge.

21. The processor of claim 20, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

22. A system, comprising:

one or more processing units to perform edge decimation on a mesh in a computing system based at least on an edge cost that is associated with an edge included in a plurality of collapse candidates and that is stored in an edge buffer associated with triangles that neighbor the edge, wherein the edge cost was previously propagated from the edge to the triangles.

23. The system of claim 22, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *